(12) United States Patent
Uchiumi et al.

(10) Patent No.: US 9,739,926 B2
(45) Date of Patent: *Aug. 22, 2017

(54) LAMINATE FILM, BACKLIGHT UNIT, AND LIQUID CRYSTAL DISPLAY DEVICE

(71) Applicant: FUJIFILM Corporation, Tokyo (JP)

(72) Inventors: Kyohisa Uchiumi, Kanagawa (JP); Eijiro Iwase, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 35 days.

This patent is subject to a terminal disclaimer.

(21) Appl. No.: 14/865,391

(22) Filed: Sep. 25, 2015

(65) Prior Publication Data

US 2016/0091649 A1 Mar. 31, 2016

(30) Foreign Application Priority Data

Sep. 26, 2014 (JP) .................................. 2014-197282
Jun. 29, 2015 (JP) .................................. 2015-130130

(51) Int. Cl.
*G02F 1/1335* (2006.01)
*F21V 8/00* (2006.01)
*B32B 5/16* (2006.01)
*C09K 11/02* (2006.01)
(Continued)

(52) U.S. Cl.
CPC ................ *G02B 6/005* (2013.01); *B32B 5/00* (2013.01); *B32B 5/16* (2013.01); *C09K 11/02* (2013.01); *G02B 6/0023* (2013.01); *B32B 7/02* (2013.01)

(58) Field of Classification Search
CPC ........ G02B 6/005; G02B 6/0023; B32B 5/00; B32B 5/16; B32B 7/02; C09K 11/02
See application file for complete search history.

(56) References Cited

U.S. PATENT DOCUMENTS

2008/0237540 A1   10/2008  Dubrow
2010/0019664 A1*   1/2010  Mishima ............. H01L 51/5268
                                           313/504

(Continued)

FOREIGN PATENT DOCUMENTS

JP  2010-027429 A   2/2010
JP  2010-528118 A   8/2010
JP  2013-544018 A  12/2013

OTHER PUBLICATIONS

Notification of Reasons for Refusal issued by the Japanese Patent Office on Oct. 27, 2016 in connection with Japanese Patent Application No. 2015-130130.

*Primary Examiner* — Nathanael R Briggs
(74) *Attorney, Agent, or Firm* — Edwards Neils LLC; Jean C. Edwards, Esq.

(57) ABSTRACT

Provided are a laminate film which enables to enhance luminance, and a backlight unit and a liquid crystal display device including this laminate film, as well as a method for producing this laminate film. Provided are laminate films including an optical functional layer and a barrier layer stacked on at least one surface of the optical functional layer, laminate films each having a film having a higher refractive index than a refractive index of the optical functional layer, on a lateral surface of the optical functional layer. It is preferable that the optical functional layer include at least one of a quantum dot and a quantum rod.

13 Claims, 7 Drawing Sheets

(51) Int. Cl.
   *B32B 5/00*        (2006.01)
   *B32B 7/02*        (2006.01)

(56)         References Cited

U.S. PATENT DOCUMENTS

2012/0113672 A1* 5/2012 Dubrow ................ B82Y 20/00
                                                    362/602
2012/0263872 A1* 10/2012 Takada ................... G02B 5/285
                                                    427/162
2015/0285963 A1* 10/2015 Asaoka ................ G02B 5/0242
                                                    349/112

* cited by examiner

LAMINATE FILM, BACKLIGHT UNIT, AND LIQUID CRYSTAL DISPLAY DEVICE

CROSS-REFERENCE TO RELATED APPLICATIONS

This patent application claims priority under 35 U.S.C. §119 to Japanese Patent Application No. 2014-197282 filed on Sep. 26, 2014 and Japanese Patent Application No. 2015-130130 filed on Jun. 29, 2015. The above applications are hereby expressly incorporated by reference, in their entirety, into the present application.

BACKGROUND OF THE INVENTION

Field of the Invention

The presently disclosed subject matter relates to a laminate film, a backlight unit, a liquid crystal display device and a method for producing a laminate film, particularly relates to a laminate film that enables to enhance luminance, and a method for producing this laminate film. Furthermore, the presently disclosed subject matter also relates to a backlight unit including this laminate film, and a liquid crystal display device including this backlight unit.

Description of the Related Art

Applications of a flat panel display such as a liquid crystal display device (LCD: liquid crystal display) (hereinafter, also referred to as "LCD") as a low power consumption and space-saving image display device are widespread year by year. The liquid crystal display device is configured from at least a backlight and a liquid crystal cell, and usually further includes members such as a polarization plate facing the backlight and a polarization plate facing the viewer.

In the flat panel display market, an enhancement in color reproducibility progresses as an improvement in LCD performance. With respect to this point, a quantum dot (also referred to as Quantum Dot, QD or quantum point.) has attracted attentions as a luminescence material in recent year. For example, when excitation light is incident from a backlight to a light conversion member including the quantum dot, the quantum dot is excited to emit fluorescent light. Quantum dots having a different luminescence property can be here used to thereby emit light having a narrow half-value width, of red light, green light and blue light, realizing white light. Since fluorescent light by the quantum dots has a narrow half-value width, wavelengths can be properly selected to thereby allow the resulting white light to be designed so that the white light is high in luminance and excellent in color reproducibility. Such a technique of providing a three-wavelength light source using the quantum dots advances to thereby expand the color reproduction region from 72%, a current ratio according to TV (television) standard (FHD, NTSC (National Television System Committee)), to 100%.

The QD particle, however, is caused to have a reduced quantum yield due to oxygen, and therefore is required to be used with being protected by a barrier film. While a resin layer containing the QD particle can be protected by a barrier film to thereby allow the surface of the resin layer to be protected, a problem is that ingress of oxygen through an end portion results in deterioration of performances. In addition, there is also the following problem: light leaked from a film end portion results in a reduction in luminance.

In response to such problems, Japanese Publication of International Patent Application No. 2013-544018 discloses a quantum dot film including a barrier layer on a lateral surface of a QD phosphor material layer. And, Japanese Publication of International Patent Application No. 2010-528118 discloses performing airtight sealing to protect a composition from deterioration factors such as oxygen, water by arranging a barrier layer on the composition including a plurality of light-emitting nano crystals.

SUMMARY OF THE INVENTION

Japanese Publication of International Patent Application No. 2013-544018, however, describes an enhancement in luminance in the normal direction of the quantum dot film, but light leakage from the lateral surface of the quantum dot film has not been studied and the problem of a reduction in luminance due to light leakage from an end surface has not been solved. Also, in Japanese Publication of International Patent Application No. 2010-528118, the barrier layer is arranged on the composition. In Japanese Publication of International Patent Application No. 2010-528118, since light leakage from a lateral surface is not considered, reflectivity of light is insufficient, and luminance can be decreased.

The presently disclosed subject matter has been made in view of such circumstances, and an object thereof is to provide a laminate film which enables to enhance luminance in use inside a backlight, a backlight unit and a liquid crystal display device including this laminate film, and a method for producing this laminate film.

In order to achieve the above object, the presently disclosed subject matter provides a laminate film comprising an optical functional layer and a barrier layer stacked on at least one surface of the optical functional layer, wherein the laminate film has a film having a higher refractive index than a refractive index of the optical functional layer, on a lateral surface of the optical functional layer.

According to the presently disclosed subject matter, the laminate film has a film having a higher refractive index than a refractive index of the optical functional layer, on a lateral surface of the optical functional layer, and therefore enables light to be reflected on the lateral surface and enables to extend the optical path length. Accordingly, luminance can be enhanced.

In another aspect of the presently disclosed subject matter, it is preferable that the optical functional layer include at least any one of a quantum dot and a quantum rod.

According to this aspect, the optical functional layer includes at least any one of a quantum dot and a quantum rod, and therefore can be used as a wavelength conversion member and can suppress variation in luminance and variation in chromaticity.

In another aspect of the presently disclosed subject matter, it is preferable that the film be a film having gas barrier properties.

According to this aspect, the film on a lateral surface of the optical functional layer has gas barrier properties, and therefore can prevent ingress of oxygen, steam, or the like through the lateral surface of the optical functional layer. Accordingly, performances of the optical functional layer can be prevented from being deteriorated.

In another aspect of the presently disclosed subject matter, it is preferable that the film be an inorganic film.

According to this aspect, the film can be formed by an inorganic film to thereby impart gas barrier properties.

In another aspect of the presently disclosed subject matter, it is preferable that the film includes at least one of oxides, nitrides and oxynitrides of one or more metals selected from silicon, aluminum, indium, tin, zinc, titanium, chromium, nickel, copper, silver and gold.

This aspect limits the material of the refractive index film, and the above material can be used to thereby impart gas barrier properties.

In another aspect of the presently disclosed subject matter, it is preferable that the film is a thin film in which a laminated structure is repeated more than once, the laminated structure including a first metal layer including one or more metals selected from aluminum, titanium, chromium, nickel, tin, copper and silver, and a metal oxide layer including an oxide of one or more metals selected from aluminum, titanium, chromium, nickel, tin, copper and silver.

According to the another aspect, a pin hole or crack in the first metal layer can be sealed by the metal oxide layer. Therefore, light leakage from an end surface of the film can be prevented.

In another aspect of the presently disclosed subject matter, it is preferable that the film further includes a second metal layer including one or more metals selected from aluminum, titanium, chromium, nickel, tin, copper and silver, on the thin film.

According to the another aspect, the second metal layer is formed on the metal oxide layer of the thin film, and the second metal layer can be used as a mirror. Therefore, light incident to the end surface of the film can be reflected by the mirror (second metal layer) at high reflectivity and can be reused, and the luminance can be enhanced.

In another aspect of the presently disclosed subject matter, the thickness of the first metal layer is preferably 5 nm or more and 50 nm or less, and the thickness of the metal oxide layer is preferably 0.1 nm or more and 5 nm or less.

In another aspect of the presently disclosed subject matter, the thickness of the film is preferably 5 to 500 nm, more preferably 20 to 200 nm.

In another aspect of the presently disclosed subject matter, the thickness of the second metal layer is preferably 10 nm or more and 200 nm or less.

These aspects limit the thickness of the film, and the thickness can be in the above range to thereby enhance luminance and also to prevent degradation of the optical functional layer over time. Further, the thickness of each film can be in the above ranges in case that the film is a thin film, the reflectivity of the end surface of the laminate film can be increased, and the luminance can be enhanced.

In another aspect of the presently disclosed subject matter, it is preferable that a refractive index of the optical functional layer be in the range from 1.3 to 1.6 and a refractive index of the film be 1.5 or more.

This aspect defines the refractive index of the optical functional layer and the refractive index of the film on a lateral surface of the optical functional layer, and the refractive indexes can be in the above ranges to thereby enhance luminance.

In another aspect of the presently disclosed subject matter, it is preferable that a difference between the refractive index of the optical functional layer and the refractive index of the film be 0.2 or more.

This aspect defines the difference between the refractive index of the optical functional layer and the refractive index of the film on a lateral surface of the optical functional layer, and the difference in refractive index can be in the above range to thereby enhance luminance.

In order to achieve the above object, the presently disclosed subject matter provides a backlight unit including at least the above-mentioned laminate film, and a light source.

The above laminate film has a film having a higher refractive index than the refractive index of the optical functional layer, on a lateral surface, and therefore enables to extend the optical path length in the laminate film and enables to enhance luminance, and thus can be suitably used for a backlight unit.

In order to achieve the above object, the presently disclosed subject matter provides a liquid crystal display device including at least the above backlight unit, and a liquid crystal cell.

The above backlight unit is incorporated in the liquid crystal display device, and can be thus suitably used.

In order to achieve the above object, the presently disclosed subject matter provides a method for producing a laminate film, including superimposing a plurality of laminate films comprising an optical functional layer and a barrier layer stacked on each of both surfaces of the optical functional layer, and forming a film having a higher refractive index than a refractive index of the optical functional layer, on a lateral surface of the optical functional layer of each of a plurality of the laminate films superimposed.

According to the method for producing a laminate film of the presently disclosed subject matter, a laminate film including an optical functional layer and a barrier layer is formed, thereafter a plurality of the laminate films are superimposed and a film having a higher refractive index than a refractive index of the optical functional layer is formed on a lateral surface of the optical functional layer, and therefore a laminate film enhanced in terms of luminance can be produced. In addition, the film can be formed on a lateral surface of each of a plurality of the laminate films at one time, and film formation can be efficiently performed.

In another aspect of the presently disclosed subject matter, it is preferable that the film be formed by a sputtering method, a vacuum vapor deposition method, an ion plating method, or a plasma CVD method.

This aspect defines the method for forming the film to be formed on a lateral surface of the optical functional layer, and the forming method can be adopted to thereby form a plurality of the laminate films at one time.

According to the laminate film and the method for producing a laminate film of the presently disclosed subject matter, the film having a higher refractive index than a refractive index of the optical functional layer is provided on a lateral surface of the optical functional layer, and therefore light can be reflected on the lateral surface of the optical functional layer and luminance can be enhanced. In addition, according to the backlight and the liquid crystal display device including this laminate film, the optical path length can be extended and luminance can be enhanced.

DETAILED DESCRIPTION OF THE EMBODIMENTS

Hereinafter, the laminate film, the backlight unit including the laminate film, the liquid crystal display device including the backlight unit, and the method for producing a laminate film, according to the presently disclosed subject matter, are described with reference to the accompanied drawings. In the present specification, the term "to" is used as meaning to encompass the respective numerical values described before and after the "to" as the lower limit and the upper limit.
(Laminate Film)

The laminate film of the presently disclosed subject matter comprises an optical functional layer and a barrier layer stacked on at least one surface of the optical functional layer, and the laminate film has a film having a higher refractive index than the refractive index of the optical functional layer, on a lateral surface of the optical functional layer.

Figure 1A:
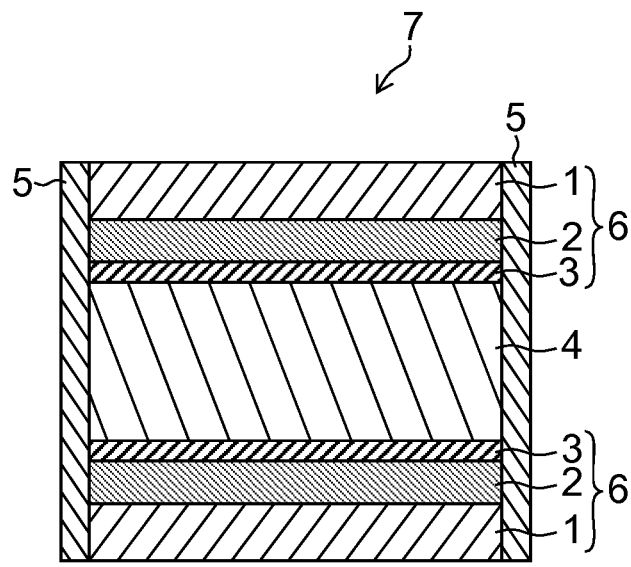
FIGS. 1A and 1B are cross-sectional views illustrating a configuration of a laminate film.
Figure 1B:
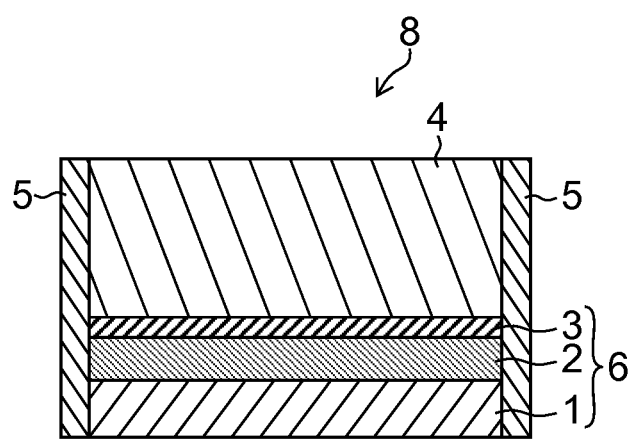

FIGS. 1A and 1B are cross-sectional views illustrating a configuration of the laminate film. FIG. 1A illustrates a laminate film 7 in which a barrier layer 6 including a support 1, an organic layer 2 and an inorganic layer 3 is provided on each of both surfaces with an optical functional layer 4 interposed. FIG. 1B illustrates a laminate film 8 in which a barrier layer 6 including a support 1, an organic layer 2 and an inorganic layer 3 is provided on one surface of an optical functional layer 4.
(Optical Functional Layer)

The optical functional layer means a layer such as a wavelength conversion layer, a high refractive index layer, a medium refractive index layer, a low refractive index layer, an antiglare layer, an antiglare and antireflection layer, an intermediate layer, and a hard coat layer. In the present embodiment, it is preferable that the optical functional layer be used as, in particular, a wavelength conversion layer including at least any one of a quantum dot and a quantum rod which are excited by incident excitation light to emit fluorescent light.

When the optical functional layer is used as a wavelength conversion layer, the optical functional layer is formed by including the quantum dot or the quantum rod, a curable compound, a thixotropic agent, a polymerization initiator, a silane coupling agent, and the like. The optical functional layer is formed by mixing these respective components to prepare a coating liquid for optical functional layer formation (hereinafter, also referred to as "coating liquid"), coating a barrier support (barrier layer), described later, with the coating liquid, and irradiating the resultant with light.
<Quantum Dot and Quantum Rod>

The quantum dot is at least excited by incident excitation light to emit fluorescent light.

The quantum dot included in the optical functional layer of the present embodiment can include at least one quantum dot, or also two or more quantum dots having a different luminescence property. A known quantum dot includes a quantum dot (A) having a center emission wavelength in the wavelength band region in the range from 600 nm to 680 nm, a quantum dot (B) having a center emission wavelength in the wavelength band region in the range from 500 nm to 600 nm, and a quantum dot (C) having a center emission wavelength in the wavelength band region in the range from 400 nm to 500 nm, and the quantum dot (A) is excited by excitation light to emit red light, the quantum dot (B) is excited by excitation light to emit green light and the quantum dot (C) is excited by excitation light to emit blue light. For example, when blue light is incident as excitation light to an optical functional layer including the quantum dot (A) and the quantum dot (B), red light emitted from the quantum dot (A), green light emitted from the quantum dot (B) and blue light penetrating through the optical functional layer can realize white light. Alternatively, ultraviolet light can be incident as excitation light to a laminate film having an optical functional layer including the quantum dots (A), (B) and (C), thereby allowing red light emitted from the quantum dot (A), green light emitted from the quantum dot (B) and blue light emitted from the quantum dot (C) to realize white light.

With respect to the quantum dot, those described in, for example, paragraphs 0060 to 0066 in Japanese Patent Application Laid-Open No. 2012-169271 can be referenced, but the quantum dot is not limited to those. For the quantum dot, a commercialized product can be used without any limitation. The emission wavelength of the quantum dot can be usually adjusted by the composition and the size of a particle.

The quantum dot may be added into the coating liquid in the form of a particle or in the form of a dispersion liquid in which the quantum dot is dispersed in a solvent. It is preferable that the quantum dot be added in the form of the dispersion liquid, from the viewpoint of suppressing aggregation of a quantum dot particle. The solvent used here is not particularly limited. It is preferable, however, that the coating liquid substantially contain no volatile organic solvent. Therefore, when the quantum dot is added to the coating liquid in the form of the dispersion liquid in which the quantum dot is dispersed in a solvent, it is preferable that a step of drying the solvent of the coating liquid be included before the barrier support is coated with the coating liquid to form the optical functional layer. From the viewpoint of decreasing the step of drying the solvent, it is also preferable that the quantum dot be added into the coating liquid in the form of a particle.

Herein, the volatile organic solvent refers to a compound which has a boiling point of 160° C. or lower, which is not cured by the curable compound in the coating liquid and external stimulus, and which is a liquid compound at 20° C. The boiling point of the volatile organic solvent is 160° C. or lower, further preferably 115° C. or lower, most preferably 30° C. or higher and 100° C. or lower.

When the coating liquid substantially contains no volatile organic solvent, the proportion of the volatile organic solvent in the coating liquid is preferably 10000 ppm or less, more preferably 1000 ppm or less.

The quantum dot can be added in an amount of, for example, about 0.1 to 10 parts by mass based on 100 parts by mass of the total amount of the coating liquid.

The quantum rod can also be used instead of the quantum dot. The quantum rod is a particle having an elongated shape, and has the same properties as those of the quantum dot. The amount of the quantum rod to be added, and the method for adding the quantum rod to the coating liquid are the same as the amount of the quantum dot, and the method for adding the quantum dot, respectively. The quantum dot and the quantum rod can also be used in combination.
<Curable Compound>

For the curable compound for use in the present embodiment, one having a polymerizable group can be widely adopted. The type of the polymerizable group is not particularly limited, and is preferably a (meth)acrylate group, a vinyl group or an epoxy group, more preferably a (meth)

acrylate group, further preferably, an acrylate group. With respect to a polymerizable monomer having two or more polymerizable groups, the respective polymerizable groups may be the same or different.

—(Meth)Acrylate—

In view of transparency, adhesion property and the like of a cured film after curing, a (meth)acrylate compound such as a monofunctional or polyfunctional (meth)acrylate monomer, a polymer or prepolymer thereof, or the like is preferable. In the presently disclosed subject matter and the present specification, the term "(meth)acrylate" is used to mean at least one or any one of acrylate and methacrylate. The same applies to the term "(meth)acryloyl" and the like.

——Bifunctional One——

The polymerizable monomer having two polymerizable groups can include a bifunctional polymerizable unsaturated monomer having two ethylenically unsaturated bond-containing groups. The bifunctional polymerizable unsaturated monomer is suitable for allowing a composition to have a low viscosity. In the present embodiment, a (meth)acrylate type compound which is excellent in reactivity and which has no problems about a remaining catalyst and the like is preferable.

In particular, neopentyl glycol di(meth)acrylate, 1,9-nonanediol di(meth)acrylate, dipropylene glycol di(meth)acrylate, tripropylene glycol di(meth)acrylate, tetraethylene glycol di(meth)acrylate, hydroxypivalate neopentyl glycol di(meth)acrylate, polyethylene glycol di(meth)acrylate, dicyclopentenyl(meth)acrylate, dicyclopentenyl oxyethyl (meth)acrylate, dicyclopentanyl di(meth)acrylate, or the like is suitably used in the presently disclosed subject matter.

The amount of the bifunctional (meth)acrylate monomer to be used is preferably 5 parts by mass or more, more preferably 10 to 80 parts by mass based on 100 parts by mass of the total amount of the curable compound included in the coating liquid, from the viewpoint that the viscosity of the coating liquid is adjusted in a preferable range.

——Tri- or Higher Functional One——

The polymerizable monomer having three or more polymerizable groups can include a polyfunctional polymerizable unsaturated monomer having three or more ethylenically unsaturated bond-containing groups. Such a polyfunctional polymerizable unsaturated monomer is excellent in terms of imparting mechanical strength. In the present embodiment, a (meth)acrylate type compound which is excellent in reactivity and which has no problems about a remaining catalyst and the like is preferable.

Specifically, ECH-modified glycerol tri(meth)acrylate, EO-modified glycerol tri(meth)acrylate, PO-modified glycerol tri(meth)acrylate, pentaerythritol triacrylate, pentaerythritol tetraacrylate, EO-modified phosphoric acid triacrylate, trimethylolpropane tri(meth)acrylate, caprolactone-modified trimethylolpropane tri(meth)acrylate, EO-modified trimethylolpropane tri(meth)acrylate, PO-modified trimethylolpropane tri(meth)acrylate, tris(acryloxyethyl)isocyanurate, dipentaerythritol hexa(meth)acrylate, dipentaerythritol penta(meth)acrylate, caprolactone-modified dipentaerythritol hexa(meth)acrylate, dipentaerythritol hydroxypenta(meth)acrylate, alkyl-modified dipentaerythritol penta(meth)acrylate, dipentaerythritol poly(meth)acrylate, alkyl-modified dipentaerythritol tri(meth)acrylate, ditrimethylolpropane tetra(meth)acrylate, pentaerythritolethoxy tetra(meth)acrylate, pentaerythritol tetra(meth)acrylate, or the like is suitable.

Among them, in particular, EO-modified glycerol tri(meth)acrylate, PO-modified glycerol tri(meth)acrylate, trimethylolpropane tri(meth)acrylate, EO-modified trimethylolpropane tri(meth)acrylate, PO-modified trimethylolpropane tri(meth)acrylate, dipentaerythritol hexa(meth)acrylate, dipentaerythritol penta(meth)acrylate, pentaerythritolethoxy tetra(meth)acrylate, or pentaerythritol tetra(meth)acrylate is suitably used in the presently disclosed subject matter.

The amount of the polyfunctional (meth)acrylate monomer to be used is preferably 5 parts by mass or more in view of the coating film strength of the optical functional layer after curing, and preferably 95 parts by mass or less from the viewpoint of suppression of gelation of the coating liquid, based on 100 parts by mass of the total amount of the curable compound included in the coating liquid.

——Monofunctional One——

A monofunctional (meth)acrylate monomer can include acrylic acid and methacrylic acid, and derivatives thereof, more specifically, a monomer having one polymerizable unsaturated bond ((meth)acryloyl group) of (meth)acrylic acid in the molecule. Specific examples thereof include the following compounds, but the present embodiment is not limited thereto.

Examples include alkyl(meth)acrylates having 1 to 30 carbon atoms in the alkyl group, such as methyl(meth)acrylate, n-butyl(meth)acrylate, isobutyl(meth)acrylate, 2-ethylhexyl(meth)acrylate, isononyl(meth)acrylate, n-octyl(meth)acrylate, lauryl(meth)acrylate and stearyl(meth)acrylate; aralkyl(meth)acrylates having 7 to 20 carbon atoms in the aralkyl group, such as benzyl(meth)acrylate; alkoxyalkyl(meth)acrylates having 2 to 30 carbon atoms in the alkoxyalkyl group, such as butoxyethyl(meth)acrylate; aminoalkyl(meth)acrylates having 1 to 20 carbon atoms in total in the (monoalkyl or dialkyl)aminoalkyl group, such as N,N-dimethylaminoethyl(meth)acrylate; polyalkylene glycol alkyl ether(meth)acrylates having 1 to 10 carbon atoms in the alkylene chain and having 1 to 10 carbon atoms in the terminal alkyl ether, such as diethylene glycol ethyl ether(meth)acrylate, triethylene glycol butyl ether(meth)acrylate, tetraethylene glycol monomethyl ether(meth)acrylate, hexaethylene glycol monomethyl ether(meth)acrylate, octaethylene glycol monomethyl ether(meth)acrylate, nonaethylene glycol monomethyl ether(meth)acrylate, dipropylene glycol monomethyl ether(meth)acrylate, heptapropylene glycol monomethyl ether(meth)acrylate and tetraethylene glycol monoethyl ether(meth)acrylate; polyalkylene glycol aryl ether(meth)acrylates having 1 to 30 carbon atoms in the alkylene chain and having 6 to 20 carbon atoms in the terminal aryl ether, such as hexaethylene glycol phenyl ether(meth)acrylate; (meth)acrylate having an alicyclic structure and having 4 to 30 carbon atoms in total, such as cyclohexyl(meth)acrylate, dicyclopentanyl(meth)acrylate, isobornyl(meth)acrylate and methylene oxide addition cyclodecatriene(meth)acrylate; fluorinated alkyl(meth)acrylates having 4 to 30 carbon atoms in total, such as heptadecafluorodecyl(meth)acrylate; (meth)acrylates having a hydroxyl group, such as 2-hydroxyethyl(meth)acrylate, 3-hydroxypropyl(meth)acrylate, 4-hydroxybutyl(meth)acrylate, triethylene glycol mono(meth)acrylate, tetraethylene glycol mono(meth)acrylate, hexaethylene glycol mono(meth)acrylate, octapropylene glycol mono(meth)acrylate and glycerol mono or di(meth)acrylate; (meth)acrylates having a glycidyl group, such as glycidyl(meth)acrylate; polyethylene glycol mono(meth)acrylates having 1 to 30 carbon atoms in the alkylene chain, such as tetraethylene glycol mono(meth)acrylate, hexaethylene glycol mono(meth)acrylate and octapropylene glycol mono(meth)acrylate; and (meth)acrylamides such as (meth)acrylamide, N,N-dimethyl (meth)acrylamide, N-isopropyl(meth)acrylamide, 2-hydroxyethyl(meth)acrylamide and acryloylmorpholine.

The amount of the monofunctional (meth)acrylate monomer to be used is preferably 10 parts by mass or more, more preferably 10 to 80 parts by mass based on 100 parts by mass of the total amount of the curable compound included in the coating liquid, from the viewpoint of adjusting the viscosity of the coating liquid in a preferable range.

—Epoxy Type Compound and the Like—

The polymerizable monomer for use in the present embodiment can include a compound having a cyclic group such as a ring-opening polymerizable cyclic ether group such as an epoxy group and an oxetanyl group. Such a compound can more preferably include a compound having a compound (epoxy compound) having an epoxy group. The compound having an epoxy group or an oxetanyl group is used in combination with the (meth)acrylate type compound to thereby tend to enhance adhesion property to the barrier layer.

Examples of the compound having an epoxy group can include polyglycidyl esters of polybasic acid, polyglycidyl ethers of polyhydric alcohol, polyglycidyl ethers of polyoxyalkylene glycol, polyglycidyl ethers of aromatic polyol, hydrogenated compounds of polyglycidyl ethers of aromatic polyol, urethane polyepoxy compounds, and epoxidized polybutadienes. These compounds can be used singly or as a mixture of two or more.

Examples of other compound having an epoxy group, which can be preferably used, can include aliphatic cyclic epoxy compounds, bisphenol A diglycidyl ethers, bisphenol F diglycidyl ethers, bisphenol S diglycidyl ethers, brominated bisphenol A diglycidyl ethers, brominated bisphenol F diglycidyl ethers, brominated bisphenol S diglycidyl ethers, hydrogenerated bisphenol A diglycidyl ethers, hydrogenerated bisphenol F diglycidyl ethers, hydrogenerated bisphenol S diglycidyl ethers, 1,4-butanediol diglycidyl ethers, 1,6-hexanediol diglycidyl ethers, glycerin triglycidyl ethers, trimethylolpropane triglycidyl ethers, polyethylene glycol diglycidyl ethers and polypropylene glycol diglycidyl ethers; polyglycidyl ethers of polyether polyol, obtained by adding one, or two or more alkylene oxides to an aliphatic polyhydric alcohol such as ethylene glycol, propylene glycol or glycerin; diglycidyl esters of aliphatic long chain dibasic acid; monoglycidyl ethers of aliphatic higher alcohol; monoglycidyl ethers of polyether alcohol, obtained by adding an alkylene oxide to phenol, cresol, butyl phenol or these phenols; and glycidyl esters of higher fatty acid.

Among these components, aliphatic cyclic epoxy compounds, bisphenol A diglycidyl ethers, bisphenol F diglycidyl ethers, hydrogenerated bisphenol A diglycidyl ethers, hydrogenerated bisphenol F diglycidyl ethers, 1,4-butanediol diglycidyl ethers, 1,6-hexanediol diglycidyl ethers, glycerin triglycidyl ethers, trimethylolpropane triglycidyl ethers, neopentyl glycol diglycidyl ethers, polyethylene glycol diglycidyl ethers and polypropylene glycol diglycidyl ethers are preferable.

A commercialized product which can be suitably used as the compound having an epoxy group or an oxetanyl group can include UVR-6216 (produced by Union Carbide Corporation), glycidol, AOEX24, Cyclomer A200, Celloxide 2021P and Celloxide 8000 (these produced by Daicel Corporation), 4-vinylcyclohexene dioxide produced by Sigma Aldrich, Epikote 828, Epikote 812, Epikote 1031, Epikote 872 and Epikote CT508 (these produced by Yuka Shell Epoxy K.K.), and KRM-2400, KRM-2410, KRM-2408, KRM-2490, KRM-2720 and KRM-2750 (these produced by Adeka Corporation). These can be used singly or in combinations of two or more.

Such a compound having an epoxy group or an oxetanyl group, but any production method thereof may be adopted, can be synthesized with reference to Literatures such as Fourth Edition Experimental Chemistry Course 20 Organic Synthesis II, p. 213, 1992, published by Maruzen Inc.; Ed. by Alfred Hasfner, The chemistry OF heterocyclic compounds-Small Ring Heterocycles part 3 Oxiranes, John & Wiley and Sons, An Interscience Publication, New York, 1985, Yoshimura, Bonding, vol. 29, No. 12, 32, 1985, Yoshimura, Bonding, vol. 30, No. 5, 42, 1986, Yoshimura, Bonding, vol. 30, No. 7, 42, 1986, Japanese Patent Application Laid-Open No. 2001-100378, Japanese Patent No. 2906245, and Japanese Patent No. 2926262.

For the curable compound for use in the present embodiment, a vinyl ether compound may also be used.

As the vinyl ether compound, a known vinyl ether compound can be appropriately selected, and, for example, one described in paragraph 0057 in Japanese Patent Application Laid-Open No. 2009-73078 can be preferably adopted.

Such a vinyl ether compound can be synthesized by, for example, the method described in Stephen. C. Lapin, Polymers Paint Colour Journal. 179 (4237), 321 (1988), namely, by a reaction of a polyhydric alcohol or a polyhydric phenol with acetylene, or a reaction of a polyhydric alcohol or a polyhydric phenol with a halogenated alkyl vinyl ether, and such method and reactions can be used singly or in combinations of two or more.

For the coating liquid in the present embodiment, a silsesquioxane compound having a reactive group described in Japanese Patent Application Laid-Open No. 2009-73078 can also be used from the viewpoints of a decrease in viscosity and an increase in hardness.

<Thixotropic Agent>

The thixotropic agent is an inorganic compound or an organic compound.

—Inorganic Substance—

One preferable aspect of the thixotropic agent is a thixotropic agent of an inorganic substance, and, for example, a needle-like compound, a chain-like compound, a flattened compound or a layered compound can be preferably used. In particular, a layered compound is preferable.

The layered compound is not particularly limited, and includes talc, mica, feldspar, kaolinite (kaolin clay), pyrophyllite (pyrophyllite clay), sericite, bentonite, smectite and vermiculite (montmorillonite, beidellite, non-tronite, saponite and the like), organic bentonite, and organic smectite.

These can be used singly or in combinations of two or more. Examples of a commercially available layered compound include, as inorganic compounds, Crown Clay, Burgess Clay #60, Burgess Clay KF and OptiWhite (these produced by Shiraishi Kogyo Kaisha Ltd.), Kaolin JP-100, NN Kaolin Clay, ST Kaolin Clay and Hardsil (these produced by Tsuchiya Kaolin Ind., Ltd.), ASP-072, Satintonplus, Translink 37 and Hydrousdelami NCD (these produced by Angel Hard Corporation), SY Kaolin, OS Clay, HA Clay and MC Hard Clay (these produced by Maruo Calcium Co., Ltd.), Rucentite SWN, Rucentite SAN, Rucentite STN, Rucentite SEN and Rucentite SPN (these produced by Co-op Chemical Co., Ltd.), Sumecton (produced by Kunimine Industries Co., Ltd.), Bengel, Bengel FW, Esben, Esben 74, Organite and Organite T (these produced by Hojun Co., Ltd.), Hodaka Jirushi, Orben, 250M, Bentone 34 and Bentone 38 (these produced by Wilbur-Ellis Company), and Laponite, Laponite RD and Laponite RDS (these produced by Nippon Silica Industrial Co., Ltd.). Such a compound may also be dispersed in a solvent.

The thixotropic agent to be added to the coating liquid is, among layered inorganic compounds, a silicate compound represented by $xM(I)_2O \cdot ySiO_2$ (also including a compound corresponding to $M(II)O$ or $M(III)_2O_3$ having an oxidation number of 2 or 3; x and y represent a positive number), and a further preferable compound is a swellable layered clay mineral such as hectorite, bentonite, smectite or vermiculite.

Particularly preferably, a layered (clay) compound modified by an organic cation (a silicate compound in which an interlayer cation such as sodium is exchanged with an organic cation compound) can be suitably used, and examples include sodium magnesium silicate (hectorite) in which a sodium ion is exchanged with an ammonium ion described below.

Examples of the ammonium ion include a monoalkyltrimethylammonium ion, a dialkyldimethylammonium ion and a trialkylmethylammonium ion having an alkyl chain having 6 to 18 carbon atoms, a dipolyoxyethylene-palm-oil-alkylmethylammonium ion and a bis(2-hydroxyethyl)-palm-oil-alkylammonium ion having 4 to 18 oxyethylene chains, and a polyoxypropylene methyldiethylammonium ion having 4 to 25 oxopropylene chains. These ammonium ions can be used singly or in combinations of two or more.

The method for producing an organic cation-modified silicate mineral in which a sodium ion of sodium magnesium silicate is exchanged with an ammonium ion is as follows: sodium magnesium silicate is dispersed in water and sufficiently stirred, and thereafter left to still stand for 16 hours or more to prepare a 4% by mass dispersion liquid; while this dispersion liquid is stirred, a desired ammonium salt is added in an amount of 30% by mass to 200% by mass relative to sodium magnesium silicate; after the addition, cation exchange occurs to allow hectorite including an ammonium salt between layers to be insoluble in water and precipitated, and therefore the precipitate is taken by filtration and dried. In the preparation, heating may also be performed for the purpose of accelerating the dispersion.

A commercialized product of the alkylammonium-modified silicate mineral includes Rucentite SAN, Rucentite SAN-316, Rucentite STN, Rucentite SEN and Rucentite SPN (these produced by Co-op Chemical Co., Ltd.), and these can be used singly or in combinations of two or more.

In the present embodiment, silica, alumina, silicon nitride, titanium dioxide, calcium carbonate, zinc oxide or the like can be used for the thixotropic agent of an inorganic substance. Such a compound can also be if necessary subjected to a treatment for regulation of hydrophilicity or hydrophobicity of the surface.

—Organic Substance—

For the thixotropic agent, a thixotropic agent of an organic substance can be used.

Examples of the thixotropic agent of an organic substance include an oxidized polyolefin and a modified urea.

The above oxidized polyolefin may be independently prepared, or a commercialized product may be used. Examples of the commercialized product include Disperlon 4200-20 (trade name, produced by Kusumoto Chemicals, Ltd.) and Flownon SA300 (trade name, produced by Kyoeisha Chemical Co., Ltd.).

The modified urea described above is a reaction product of an isocyanate monomer or an adduct thereof with an organic amine. The modified urea described above may be independently prepared, or a commercialized product may be used. Examples of the commercialized product include BYK 410 (produced by BYK).

—Content—

The content of the thixotropic agent in the coating liquid is preferably 0.15 to 20 parts by mass, more preferably 0.2 to 10 parts by mass, particularly preferably 0.2 to 8 parts by mass, based on 100 parts by mass of the curable compound. In particular, in the case of the thixotropic agent of an inorganic substance, when the content is 20 parts by mass or less based on 100 parts by mass of the curable compound, brittleness tends to be improved.

<Polymerization Initiator>

The coating liquid can include a known polymerization initiator as a polymerization initiator. With respect to the polymerization initiator, for example, paragraph 0037 in Japanese Patent Application Laid-Open No. 2013-043382 can be referenced. The polymerization initiator is preferably in an amount of 0.1% by mol or more, more preferably 0.5 to 2% by mol based on the total amount of the curable compound included in the coating liquid. The polymerization initiator is preferably included in an amount of 0.1% by mass to 10% by mass, further preferably 0.2% by mass to 8% by mass, as the percentage by mass in the entire curable composition excluding the volatile organic solvent.

<Silane Coupling Agent>

The optical functional layer formed from the coating liquid including the silane coupling agent can exhibit excellent light resistance because of being strong in adhesion property to an adjacent layer due to the silane coupling agent. This is based on a hydrolysis reaction or a condensation reaction of the silane coupling agent included in the optical functional layer for formation of a covalent bond with the surface of the adjacent layer and the constituent component of the optical functional layer. When the silane coupling agent has a reactive functional group such as a radical polymerizable group, formation of a crosslinking structure with a monomer component forming the optical functional layer can also provide an enhancement in adhesion property to the adjacent layer to the optical functional layer.

For the silane coupling agent, a known silane coupling agent can be used without any limitation. A preferable silane coupling agent in terms of adhesion property can include a silane coupling agent represented by the following general formula (1) described in Japanese Patent Application Laid-Open No. 2013-43382.

[Formula 1]

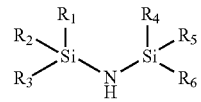

General formula (1)

(wherein $R_1$ to $R_6$ each independently represent a substituted or unsubstituted alkyl group or aryl group, provided that at least one of $R_1$ to $R_6$ represents a substituent including a radical polymerizable carbon-carbon double bond.)

$R_1$ to $R_6$ each independently represent a substituted or unsubstituted alkyl group or aryl group. $R_1$ to $R_6$ each preferably represent an unsubstituted alkyl group or an unsubstituted aryl group except for a case where $R_1$ to $R_6$ represent a substituent including a radical polymerizable carbon-carbon double bond. The alkyl group is preferably an alkyl group having 1 to 6 carbon atoms, more preferably a methyl group. The aryl group is preferably a phenyl group. $R_1$ to $R_6$ each particularly preferably represent a methyl group.

At least one of $R_1$ to $R_6$ has a substituent including a radical polymerizable carbon-carbon double bond, and preferably, two of $R_1$ to $R_6$ have a substituent including a radical polymerizable carbon-carbon double bond. Furthermore, it is particularly preferable that one of $R_1$ to $R_3$ have a substituent including a radical polymerizable carbon-carbon double bond and one of $R_4$ to $R_6$ have a substituent including a radical polymerizable carbon-carbon double bond.

When the silane coupling agent represented by the following general formula (1) has two or more substituents including a radical polymerizable carbon-carbon double bond, the respective substituents may be the same or different, and are preferably the same.

It is preferable that the substituent including a radical polymerizable carbon-carbon double bond be represented by —X—Y: wherein X represents a single bond, an alkylene group having 1 to 6 carbon atoms, or an arylene group, preferably represents a single bond, a methylene group, an ethylene group, a propylene group or a phenylene group; and Y represents a radical polymerizable carbon-carbon double bond group, preferably an acryloyloxy group, a methacryloyloxy group, an acryloylamino group, a methacryloylamino group, a vinyl group, a propenyl group, a vinyloxy group or a vinylsulfonyl group, more preferably a (meth)acryloyloxy group.

$R_1$ to $R_6$ may also have a substituent other than the substituent including a radical polymerizable carbon-carbon double bond. Examples of such a substituent include alkyl groups (such as a methyl group, an ethyl group, an isopropyl group, a tert-butyl group, a n-octyl group, a n-decyl group, a n-hexadecyl group, a cyclopropyl group, a cyclopentyl group and a cyclohexyl group), aryl groups (such as a phenyl group and a naphthyl group), halogen atoms (such as fluorine, chlorine, bromine and iodine), acyl groups (such as an acetyl group, a benzoyl group, a formyl group and a pivaloyl group), acyloxy groups (such as an acetoxy group, an acryloyloxy group and a methacryloyloxy group), alkoxycarbonyl groups (such as a methoxycarbonyl group and an ethoxycarbonyl group), aryloxycarbonyl groups (such as a phenyloxycarbonyl group), and sulfonyl groups (such as a methanesulfonyl group and a benzenesulfonyl group).

The silane coupling agent is preferably included in the coating liquid in the range from 1 to 30% by mass, more preferably 3 to 30% by mass, further preferably 5 to 25% by mass, from the viewpoint of a further more enhancement in adhesion property to the adjacent layer.

In the present embodiment, the volatile organic solvent described above can be used in the coating liquid. A preferable aspect is an aspect in which the coating liquid substantially contains no volatile organic solvent. In another aspect, the volatile organic solvent can be contained in the coating liquid in, for example, an amount of 10% by mass or more and 50% by mass or less, and can also be contained in an amount of 10% by mass or more and 40% by mass or less. With respect to specific examples of the solvent which can be used, paragraphs 0038 to 0041 in Japanese Patent Application Laid-Open No. 2013-105160 can be referenced.

(Barrier Layer)

In the laminate film of the present embodiment, the barrier layer is stacked on at least one surface of the optical functional layer. The barrier layer may be any known barrier film. FIGS. 1A and 1B illustrate the barrier layer 6 formed by including at least the support 1, the organic layer 2 and the inorganic layer 3, but the presently disclosed subject matter is not limited thereto. The barrier layer 6 may be formed on each of both surfaces of the optical functional layer 4 as illustrated in FIG. 1A, or may be formed on any one thereof as illustrated in FIG. 1B. When the barrier layer 6 is formed on each of both surfaces of the optical functional layer 4, it is preferable that the support 1 of the barrier layer 6 on at least one surface be a flexible support.

The barrier layer may include at least an inorganic layer, or may include at least one inorganic layer and at least one organic layer on the flexible support. Such stacking of a plurality of layers is preferable from the viewpoint of an enhancement in light resistance because of being capable of further more enhancing barrier properties. On the other hand, the light transmittance of the wavelength conversion member tends to be reduced as the number of layers stacked is increased, and therefore it is desirable that the number of layers stacked be increased as long as a good light transmittance can be kept. Specifically, the barrier layer preferably has a total light transmittance in the visible light region of 80% or more, and preferably has an oxygen permeability of 1.00 $cm^3/(m^2 \cdot day \cdot atm)$ or less. The total light transmittance refers to the average of light transmittances over the visible light region.

The oxygen permeability of the barrier layer is more preferably 0.1 $cm^3/(m^2 \cdot day \cdot atm)$ or less, particularly preferably 0.01 $cm^3/(m^2 \cdot day \cdot atm)$ or less, more particularly preferably 0.001 $cm^3/(m^2 \cdot day \cdot atm)$ or less. The oxygen permeability here is the value measured using an oxygen gas permeability measuring apparatus (manufactured by MOCON Inc., OX-TRAN 2/20: trade name) under conditions of a measurement temperature of 23° C. and a relative humidity of 90%. In addition, the visible light region refers to the wavelength band region of 380 to 780 nm, and the total light transmittance represents the average of light transmittances excluding contributions of light absorption and reflection of the optical functional layer.

The total light transmittance in the visible light region is more preferably 90% or more. A lower oxygen permeability is more preferable, and a higher total light transmittance in the visible light region is more preferable.

—Flexible Support—

The barrier layer has the flexible support for the purposes of an enhancement in strength, ease of film formation, and the like.

In FIGS. 1A and 1B, the barrier layer 6 is formed so that the inorganic layer 3, the organic layer 2 and the support 1 are located in this order. The barrier layer is not limited thereto, and may be formed so that the inorganic layer and the support are located in this order. Alternatively, the support may be arranged between the organic layer and the inorganic layer, between the two organic layers, or between the two inorganic layers. Furthermore, two, or three or more of the supports may also be included in the laminate film.

It is preferable that the flexible support be a transparent support which is transparent to visible light. The phrase "transparent to visible light" here refers to a light transmittance in the visible light region of 80% or more, preferably 85% or more. The light transmittance for use as a measure of transparency can be calculated by the method described in JIS-K7105, namely, by measuring the total light transmittance and the amount of light to be scattered, by use of an integrating sphere light transmittance measuring apparatus, and subtracting the diffuse transmittance from the total light transmittance. With respect to the support, paragraphs 0046 to 0052 in Japanese Patent Application Laid-Open No. 2007-290369 and paragraphs 0040 to 0055 in Japanese Patent Application Laid-Open No. 2005-096108 can be referenced. The thickness of the support is preferably in the range from 10 to 500 µm, inter alia, preferably in the range from 15 to 300 µm, particularly preferably in the range from 15 to 120 µm, more particularly preferably in the range from 15 to 100 µm, further preferably in the range from 25 to 110 µm, more further preferably in the range from 25 to 60 µm in terms of gas barrier properties, impact resistance and the like. For the flexible support, a commercialized product may be used, and for example, Cosmoshine A4100 produced by Toyobo Co., Ltd., which is a polyethylene terephthalate (PET) film provided with an easily bonding layer, can be used.

The support can also be used for any of the barrier layers, or both of the barrier layers. When the barrier layers are included on both surfaces of the support, these may be the same or different.

—Inorganic Layer—

The barrier layer may include an inorganic layer. The inorganic layer is a layer mainly including an inorganic material, and is preferably a layer formed from only an inorganic material.

It is preferable that the inorganic layer be a layer having a gas barrier function of blocking oxygen. Specifically, it is preferable that the oxygen permeability of the inorganic layer be 1.00 $cm^3/(m^2 \cdot day \cdot atm)$ or less. The oxygen permeation coefficient of the inorganic layer can be determined by attaching the wavelength conversion layer to a detector of an oxygen concentration meter manufactured by Orbisphere Laboratories, via silicone grease, and converting the oxygen permeation coefficient from the equilibrium oxygen concentration value. It is also preferable that the inorganic layer have a function of blocking steam.

Two, or three or more of the inorganic layers may also be included in the barrier layer.

The inorganic material forming the inorganic layer is not particularly limited, and for example, a metal, or various inorganic compounds such as inorganic oxide, nitride or oxynitride can be used therefor. For element(s) forming the inorganic material, silicon, aluminum, magnesium, titanium, tin, indium and cerium are preferable, and these may be included singly or two or more may be included. Specific examples of the inorganic compound can include silicon oxide, silicon oxynitride, aluminum oxide, magnesium oxide, titanium oxide, tin oxide, an indium oxide alloy, silicon nitride, aluminum nitride and titanium nitride. As the inorganic layer, a metal film, for example, an aluminum film, a silver film, a tin film, a chromium film, a nickel film or a titanium film may also be provided.

It is particularly preferable that the inorganic layer having barrier properties be an inorganic layer including at least one compound selected from silicon nitride, silicon oxynitride, silicon oxide and aluminum oxide, among the above materials. The reason is because the inorganic layer formed from such a material is good in adhesion property to the organic layer, and therefore, not only, even when the inorganic layer has a pinhole, the organic layer can effectively fill in the pinhole to suppress fracture, but also, when the inorganic layer is stacked, an extremely good inorganic layer film can be formed to result in a further enhancement in barrier properties.

The method for forming the inorganic layer is not particularly limited, and for example, various film formation methods in which a film formation material can be evaporated or scattered and thus deposited on a surface onto which the material is to be vapor-deposited.

Examples of the method for forming the inorganic layer include a vacuum vapor deposition method in which an inorganic material such as an inorganic oxide, an inorganic nitride, an inorganic oxynitride or a metal is heated and vapor-deposited; an oxidation reaction vapor deposition method in which an inorganic material is used as a raw material and oxidized by introduction of an oxygen gas, and thus vapor-deposited; a sputtering method in which an inorganic material is used as a target raw material and sputtered by introduction of an argon gas and an oxygen gas, and thus vapor-deposited; a physical vapor deposition method such as an ion plating method in which an inorganic material is heated by a plasma beam generated by a plasma gun, and thus vapor-deposited, and in the case of formation of a vapor deposition film of silicon oxide or silicon nitride, a plasma chemical vapor deposition method (Chemical Vapor Deposition Method) in which an organosilicon compound is used as a raw material. Vapor deposition may be performed on the surface of a support, a base material film, a wavelength conversion layer, an organic layer or the like as a base material.

It is preferable that the silicon oxide film be formed from an organosilicon compound as a raw material by use of a low-temperature plasma chemical vapor deposition method. This organosilicon compound specifically includes 1,1,3,3-tetramethyldisiloxane, hexamethyldisiloxane, vinyltrimethylsilane, hexamethyldisilane, methylsilane, dimethylsilane, trimethylsilane, diethylsilane, propylsilane, phenylsilane, vinyltriethoxysilane, tetramethoxysilane, phenyltriethoxysilane, methyltriethoxysilane and octamethylcyclotetrasiloxane. Among the above organosilicon compounds, tetramethoxysilane (TMOS) or hexamethyldisiloxane (HMDSO) is preferably used because of being excellent in handleability and properties of a vapor deposition film.

The thickness of the inorganic layer may be 1 nm to 500 nm, and is preferably 5 nm to 300 nm, particularly preferably 10 nm to 150 nm. The reason is because the film thickness of an adjacent inorganic layer can be in the above range to thereby not only achieve good barrier properties, but also suppress reflection on the inorganic layer, resulting in providing a laminate film higher in light transmittance.

It is preferable that the laminate film include at least one inorganic layer adjacent to the optical functional layer. It is also preferable that the inorganic layer be in direct contact with each of both surfaces of the optical functional layer.

—Organic Layer—

The organic layer refers to a layer which mainly includes an organic material, in which the organic material preferably occupies 50% by mass or more, further preferably 80% by mass or more, particularly preferably 90% by mass or more.

With respect to the organic layer, paragraphs 0020 to 0042 in Japanese Patent Application Laid-Open No. 2007-290369 and paragraphs 0074 to 0105 in Japanese Patent Application Laid-Open No. 2005-096108 can be referenced. Herein, it is preferable that the organic layer include a cardo polymer. The reason is because adhesion property of the organic layer to the adjacent layer, in particular, also adhesion property thereof to the inorganic layer can be thus improved to achieve much more excellent gas barrier properties. With respect to the detail of the cardo polymer, paragraphs 0085 to 0095 in Japanese Patent Application Laid-Open No. 2005-096108 described above can be referenced. The film thickness of the organic layer is preferably in the range from 0.05 µm to 10 µm, inter alia, preferably in the range from 0.5 to 10 µm. When the organic layer is formed by a wet coating method, the film thickness of the organic layer is preferably in the range from 0.5 to 10 µm, inter alia, preferably in the range from 1 µm to 5 µm. When the organic layer is formed by a dry coating method, the film thickness is preferably in the range from 0.05 μm to 5 μm, inter alia, preferably in the range from 0.05 μm to 1 μm. The reason is because the film thickness of the organic layer formed by a wet coating method or a dry coating method can be in the above range to thereby more improve adhesion property to the inorganic layer.

With respect to other details of the inorganic layer and the organic layer, the descriptions of Japanese Patent Application Laid-Open No. 2007-290369 and Japanese Patent Application Laid-Open No. 2005-096108 described above and furthermore US 2012/0113672 A1 can be referenced.

(Methods for Forming Barrier Layer and Optical Functional Layer)

Figure 2:
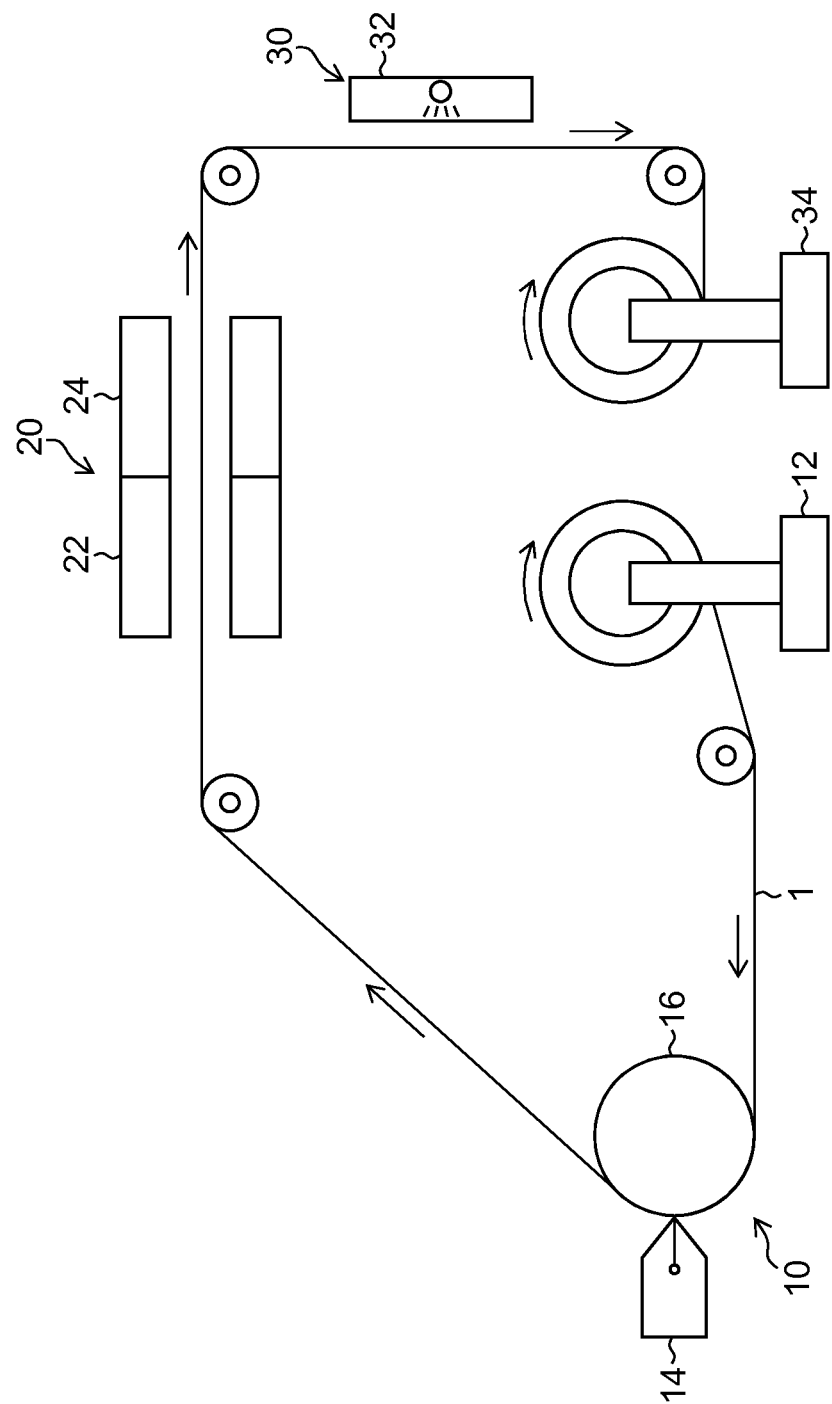
FIG. 2 is a schematic view of one example of a production facility for use in formation of an organic layer.
Figure 3:
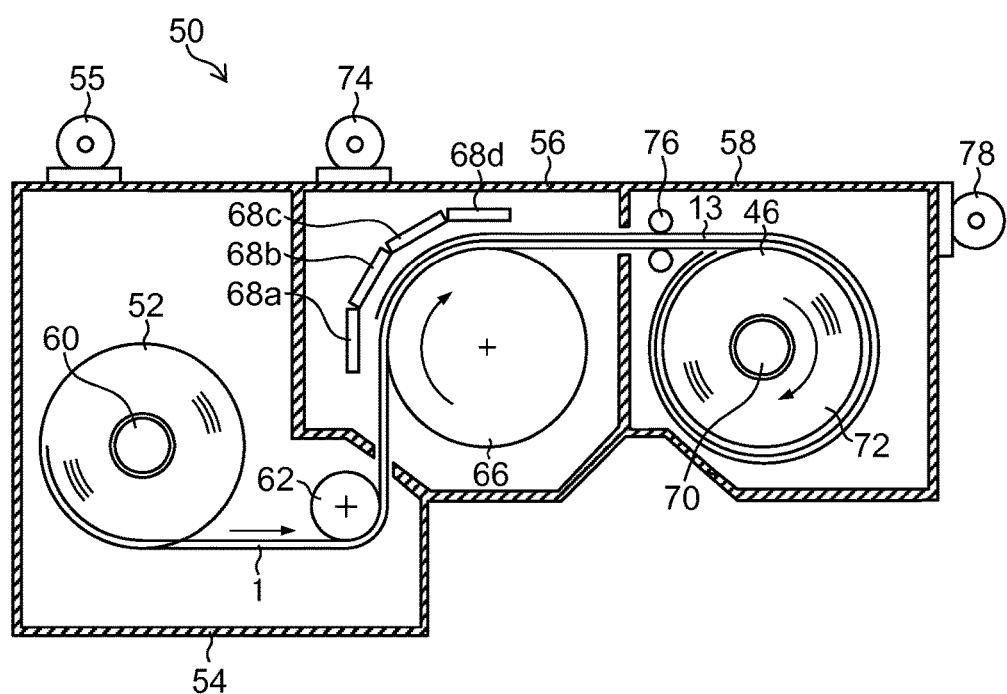
FIG. 3 is a schematic view of one example of a production facility for use in formation of an inorganic layer.
Figure 4:
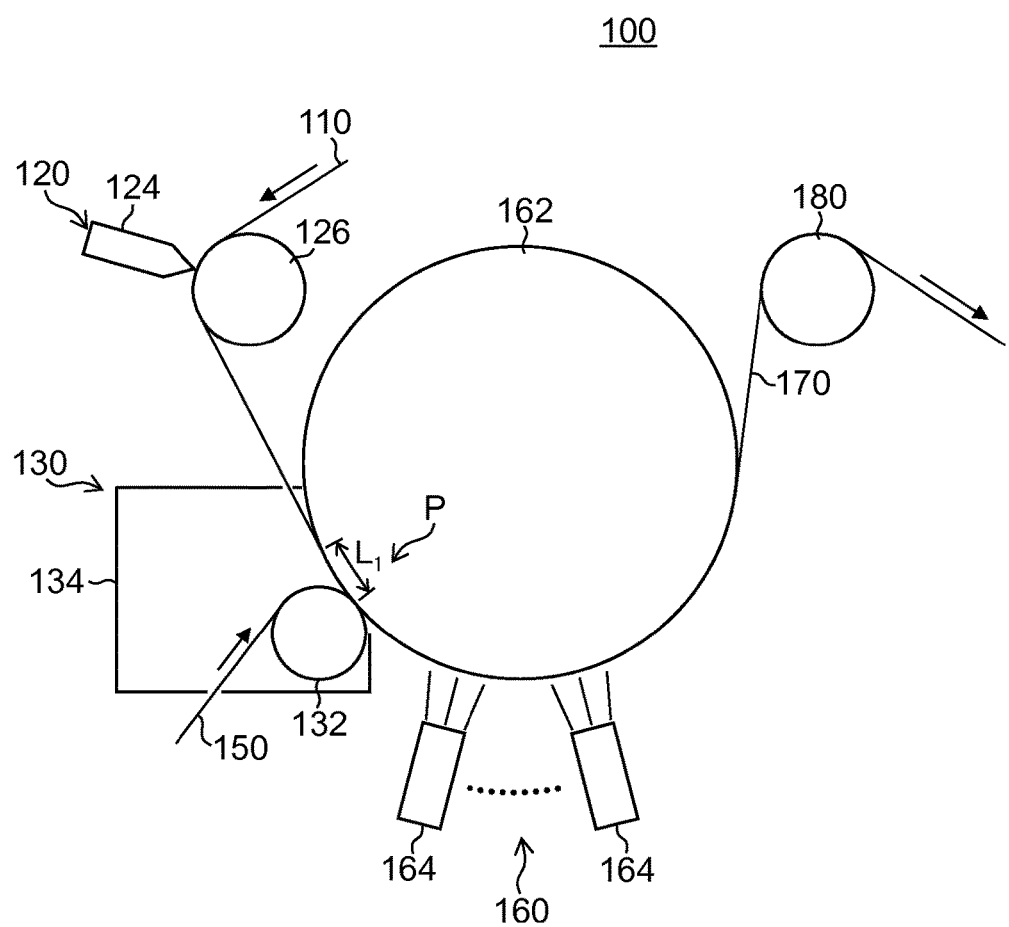
FIG. 4 is a schematic view of one example of a production facility for use in formation of the laminate film.

Next, the methods for forming the barrier layer and the optical functional layer in production of the laminate film are described. FIG. 2 is a schematic view of one example of a production facility for use in formation of the organic layer, and FIG. 3 is a schematic view of one example of a production facility for use in formation of the inorganic layer. In addition, FIG. 4 is a schematic view illustrating one example of a production facility for use in formation of the optical functional layer. Herein, the apparatuses illustrated in FIG. 2 to FIG. 4 are merely examples, and the respective layers can be formed by the methods described above.

In organic layer formation, first, the support 1 is continuously conveyed from a feeding machine 12 to a coating portion 10, as illustrated in FIG. 2. In the coating portion 10, the surface of the support 1 continuously conveyed is coated with a coating liquid for organic layer formation, and the organic layer is formed.

In the coating portion 10, for example, a die coater 14, and a back-up roller 16 arranged opposite to the die coater 14 are disposed. An opposite surface to a surface on which the organic layer is to be formed, of the support 1, is rolled around the back-up roller 16, the surface of the support 1 continuously conveyed is coated with the coating liquid for organic layer formation through a discharge port of the die coater 14, and the organic layer is formed.

The support 1 coated with the coating liquid for organic layer formation is conveyed to a drying portion 20. The drying portion 20 includes a drying apparatus 22 and a heating apparatus 24, and dries the coating liquid for organic layer formation, with which the support 1 is coated. The drying apparatus 22 evaporates a solvent included in the organic layer. The heating apparatus 24 may also be if necessary used in heating for removal of the solvent and in film curing.

The support 1 dried in the drying portion 20 is conveyed to an ultraviolet irradiation portion 30. The ultraviolet irradiation portion 30 includes an ultraviolet irradiation apparatus 32, and the coating liquid for organic layer formation is irradiated with ultraviolet light by an ultraviolet lamp. A monomer and the like in the coating liquid for organic layer formation are crosslinked by ultraviolet light to form the organic layer.

The support 1 with the organic layer formed thereon by the ultraviolet irradiation portion 30 is subjected to attachment of a protection film (not illustrated) onto the organic layer, and the support 1 is rolled up by a roll-up machine 34 in a roll shape and recovered. While there is described, in FIG. 2, an apparatus in which the protection film is attached to the support 1 and the resultant is rolled up by the roll-up machine 34, the support 1 may also be subjected to the next step (inorganic layer formation or the like) as it is without attachment of the protection film.

The inorganic layer can be formed by a roll-to-roll type vacuum film formation apparatus as illustrated in FIG. 3. An inorganic film production apparatus 50 illustrated in FIG. 3 is an apparatus which forms the inorganic layer on the organic layer.

The support 1 with the organic layer 2 formed thereon, which is rolled up by the roll-up machine, is filled as a support roll 52 in a rotation shaft 60 of a support supply chamber 54.

In the support supply chamber 54, the rotation shaft 60 is rotated in a counterclockwise direction in the Figure by a driving source not illustrated, to feed the support 1 from the support roll 52, and a guide roller 62 guides the support 1 to a predetermined route to feed the support 1 to an inorganic film formation chamber 56. In the process of feeding the support 1 to the inorganic film formation chamber 56, the protection film attached after organic layer formation is peeled. The support supply chamber 54 is a vacuum chamber, and is evacuated to a predetermined pressure (degree of vacuum) by a vacuum evacuation device 55. In the inorganic film production apparatus 50, the pressure of the support supply chamber 54 is inhibited from adversely affecting film formation of an inorganic film in the inorganic film formation chamber 56, described later.

The inorganic film formation chamber 56 is configured to have a drum 66, film formation devices 68a, 68b, 68c and 68d, and a vacuum evacuation device 74. When the inorganic film is obtained by performing film formation by sputtering, plasma CVD or the like, a high-frequency power source or the like is also disposed for the inorganic film formation chamber 56.

The support conveyed from the support supply chamber 54 is hung around in a predetermined region on the periphery of the drum 66 and conveyed on a predetermined conveyance route with being supported/guided by the drum 66, and the inorganic layer is formed on the organic layer 2 of the support 1 by the film formation devices 68a to 68d and the like.

The film formation devices 68a to 68d are used for forming the inorganic layer 3 on the organic layer 2 of the support 1 by a vacuum film formation method, and are configured by various members depending on the vacuum film formation method to be performed. For example, when film formation of the inorganic layer is performed by the CVD method, the film formation devices 68a to 68d are configured to have an introduction device of a reaction gas, and the like. When film formation of the inorganic layer is performed by the sputtering method, the film formation devices 68a to 68d are configured to have a retention device of a target, a high-frequency electrode, a supply device of a sputtering gas, and the like.

The support 1 with the inorganic layer formed thereon is then fed to a support roll-up chamber 58. In the support roll-up chamber 58, a rotation shaft 70 is rotated in a clockwise direction in the Figure by a driving source not illustrated, to roll up the support by a support roll 72. A touch roll 76 is provided on the conveyance route of the support 1 after formation of the inorganic layer, and a protection film (not illustrated) is attached by the touch roll 76. The support roll-up chamber 58 is a vacuum chamber as in the support supply chamber 54, and evacuated to a predetermined pressure (degree of vacuum) by a vacuum evacuation device 78 to thereby prevent formation of the inorganic layer from being adversely affected.

A barrier support 110 in which the organic layer 2 and the inorganic layer 3 as the barrier layer are formed on the support 1 is then subjected to formation of the optical functional layer and formation of the barrier layer on the optical functional layer formed. FIG. 4 illustrates one example of a production facility 100 for film formation of the optical functional layer.

The barrier support 110 (when the protection film is attached, the protection film is peeled) is continuously conveyed from a feeding machine not illustrated, to a coating portion 120. For example, the barrier support 110 is fed from the feeding machine at a conveyance rate of 1 to 50 m/min, but the conveyance rate is not limited thereto. In such feeding, for example, a tensile force of 20 to 150 N/m, preferably a tensile force of 30 to 100 N/m is applied to the barrier support 110.

In the coating portion 120, the surface of the barrier support 110 continuously conveyed is coated with the coating liquid, and a coating film is formed. In the coating portion 120, for example, a die coater 124, and a back-up roller 126 arranged opposite to the die coater 124 are disposed. An opposite surface to a surface on which the optical functional layer is to be formed, of the barrier support 110, is rolled around the back-up roller 126, the surface of the barrier support 110 continuously conveyed is coated with the coating liquid through a discharge port of the die coater 124, and a coating film is formed. The coating film here refers to the coating liquid, with which the barrier support 110 is coated, before a polymerization treatment.

The die coater 124 to which an extrusion coating method is applied is illustrated as the coating apparatus in FIG. 4, but not limited thereto, and a coating apparatus to which various methods such as a curtain coating method, an extrusion coating method, a rod coating method or a roll coating method is applied can be used.

The barrier support 110 which passes through the coating portion 120 and on which the coating film is formed is continuously conveyed to a lamination portion 130. In the lamination portion 130, a barrier support 150 is laminated on the coating film, and the coating film is sandwiched between the barrier support 110 and the barrier support 150. The barrier support 110 and the barrier support 150 may be the same or different in terms of the composition and the configuration.

A back-up roller 162 is arranged at a position opposite to a lamination roller 132. With respect to the barrier support 110 on which the coating film is formed, an opposite surface to the surface on which the coating film is formed is rolled around the back-up roller 162, and the barrier support 110 is continuously conveyed to a lamination position P. The lamination position P means a position where the barrier support 150 and the coating film are started to be brought into contact with each other. It is preferable that the barrier support 110 be rolled around the back-up roller 162 before the support reaches the lamination position P. The reason is because, even if wrinkle is generated on the barrier support 110, the wrinkle can be smoothed and removed by the back-up roller 162 until the support reaches the lamination position P. Accordingly, a distance L1 from the position (contact position) where the barrier support 110 is rolled around the back-up roller 162, to the lamination position P is preferably longer, for example, preferably 30 mm or more, and the upper limit thereof is usually determined by the diameter and the path line of the back-up roller 162.

In the present embodiment, lamination of the barrier support 150 is performed by the back-up roller 162 and the lamination roller 132 for use in a polymerization treatment portion 160. That is, the back-up roller 162 for use in the polymerization treatment portion 160 also serves as a roller for use in the lamination portion 130. The present embodiment, however, is not limited to the above mode, and a roller for lamination, other than the back-up roller 162, can be separately disposed in the lamination portion 130 so as to allow the back-up roller 162 not to serve as a roller for lamination.

The back-up roller 162 for use in the polymerization treatment portion 160 can be used in the lamination portion 130 to thereby reduce the number of rollers. The back-up roller 162 can also be used as a heat roller for the barrier support 110.

The barrier support 150 fed from the feeding machine not illustrated is rolled around the lamination roller 132, and continuously conveyed between the lamination roller 132 and the back-up roller 162. The barrier support 150 is laminated on the coating film formed on the barrier support 110, at the lamination position P. Thus, the coating film is sandwiched between the barrier support 110 and the barrier support 150. The lamination refers to superimposing of the barrier support 150 on the coating film for stacking.

The distance between the lamination roller 132 and the back-up roller 162 is preferably equal to or more than the value of the total thickness of the barrier support 110, the optical functional layer obtained by polymerization and curing of the coating film, and the barrier support 150. It is preferable that the distance between the lamination roller 132 and the back-up roller 162 be equal to or less than the length obtained by adding 5 mm to the total thickness of the barrier support 110, the coating film and the barrier support 150. The distance between the lamination roller 132 and the back-up roller 162 can be equal to or less than the length obtained by adding 5 mm, thereby preventing ingress of bubbles between the barrier support 150 and the coating film. The distance between the lamination roller 132 and the back-up roller 162 here refers to the shortest distance between the outer periphery of the lamination roller 132 and the outer periphery of the back-up roller 162.

A thermoregulator can be mounted to the main body of the back-up roller 162 to thereby adjust the temperature of the back-up roller 162.

In the step of stacking the barrier support 150 on the coating film, the barrier support 150 is preferably attached onto the coating film by nipping at a linear pressure of 5 to 300 N/cm, more preferably nipping at a linear pressure of 10 to 200 N/cm, particularly preferably nipping at a linear pressure of 30 to 100 N/cm. The attachment method is not restricted, and a method in which attachment is made without a nip roll may also be adopted.

In order to suppress thermal deformation after the coating film is sandwiched between the barrier support 110 and the barrier support 150, the difference between the temperature of the back-up roller 162 in the polymerization treatment portion 160 and the temperature of the barrier support 110, and the difference between the temperature of the back-up roller 162 and the temperature of the barrier support 150 are preferably 30° C. or lower, more preferably 15° C. or lower, and most preferably, these temperatures are the same.

In order to reduce the difference with the temperature of the back-up roller 162, it is preferable that the barrier support 110 and the barrier support 150 be heated in a heating chamber 134 if the heating chamber 134 is provided. For example, hot air can be supplied to the heating chamber 134 by a hot air generation apparatus not illustrated, to heat the barrier support 110 and the barrier support 150.

The barrier support 110 may also be rolled around the back-up roller 162 whose temperature is adjusted, to thereby heat the barrier support 110 by the back-up roller 162.

On the other hand, with respect to the barrier support 150, the lamination roller 132 can be used as a heat roller to thereby heat the barrier support 150 by the lamination roller 132. The heating chamber 134 and the heat roller, however, are not essential, and can be if necessary provided.

The case is described in FIG. 4, where both surfaces of the optical functional layer (coating film) are sandwiched between the barrier support 110 and the barrier support 150, and the barrier layer is provided on each of the both surfaces, but the barrier support 150 can also be replaced with other film or support in the case where the barrier layer is provided on only one surface of the optical functional layer.

After the coating film is formed on the barrier support 110 and the barrier support 150 is laminated thereon, the coating film can be subjected to polymerization and curing by light irradiation to provide the optical functional layer. The curing conditions can be appropriately set depending on the type of a curable compound to be used, and the composition of the coating liquid. When a solvent is included in the coating liquid, a drying treatment for removal of the solvent may be conducted before the polymerization treatment is performed. The polymerization treatment of the coating film is performed in the state where the coating film is sandwiched between the two barrier supports.

In the apparatus illustrated in FIG. 4, the barrier support 110, with the coating film formed thereon and the barrier support 150 laminated, is conveyed to the polymerization treatment portion 160. The polymerization treatment portion 160 includes the back-up roller 162, and a light irradiation apparatus 164 at a position opposite to the back-up roller 162. The barrier support 110 and the barrier support 150 which sandwich the coating film are continuously conveyed between the back-up roller 162 and the light irradiation apparatus 164.

Light to be radiated by the light irradiation apparatus 164 may be determined depending on the type of the curable compound included in the coating liquid, and examples include ultraviolet light. For the light source which emits ultraviolet light, for example, a low-pressure mercury lamp, a medium-pressure mercury lamp, a high-pressure mercury lamp, an ultrahigh-pressure mercury lamp, a carbon-arc lamp, a metal halide lamp, a xenon lamp, an LED, a laser or the like can be used. The amount of light to be radiated may be set in the range so as to allow polymerization and curing of the coating film to progress, and for example, ultraviolet light can be radiated toward the coating film in an amount to be radiated of 10 to 10000 mJ/cm$^2$. The amount of light to be radiated toward the coating film can be, for example, 10 to 10000 mJ/cm$^2$, and is preferably 10 to 1000 mJ/cm$^2$, more preferably 50 to 800 mJ/cm$^2$.

In the polymerization treatment portion 160, while the coating film is sandwiched between the barrier support 110 and the barrier support 150, and the barrier support 110 is rolled around the back-up roller 162 and continuously conveyed, irradiation with light can be performed from the light irradiation apparatus 164, thereby curing the coating film to form the optical functional layer.

In the present embodiment, the barrier support 110 is rolled around the back-up roller 162 and continuously conveyed, but the barrier support 150 can also be rolled around the back-up roller 162 and continuously conveyed.

The phrase "rolled around the back-up roller 162" refers to a state where any of the barrier support 110 and the barrier support 150 is in contact with the surface of the back-up roller 162 at a certain lap angle. Accordingly, while the barrier support 110 and the barrier support 150 are continuously conveyed, these are moved in synchronization with the rotation of the back-up roller 162. Rolling around the back-up roller 162 may be performed at least during irradiation with light.

The temperature of the back-up roller 162 can be determined in consideration of heat generation in light irradiation, the curing efficiency of the coating film, and generation of wrinkle deformation on the barrier support 110 and the barrier support 150 on the back-up roller 162. The temperature of the back-up roller 162 is preferably set, for example, in the range from 10 to 95° C., more preferably from 15 to 85° C. The temperature of the roller here refers to the surface temperature of the roller.

The distance between the lamination position P and the light irradiation apparatus 164 can be, for example, 30 mm or more.

The coating film is sandwiched between the barrier support 110 and the barrier support 150, and irradiated with light and thus cured to form the optical functional layer, thereby producing a laminate film 170 including the barrier layer on each of both surfaces. The laminate film 170 is peeled from the back-up roller 162 by a peeling roller 180. The laminate film 170 is continuously conveyed to a roll-up machine not illustrated, and rolled up in a roll shape.

The method is described in FIG. 4, where the polymerization treatment is performed by light irradiation, but, when the curable compound included in the coating liquid is to be polymerized by heating, the polymerization treatment can be performed by heating such as blowing of warm air. For the method of attaching the barrier support 110 and the barrier support 150, an attachment method by a nip roller, or an attachment method in which a clearance is provided between rollers, other than the methods described above, can be used.

(Film Having Higher Refractive Index than Refractive Index of Optical Functional Layer)

The laminate film of the present embodiment further includes a film 5 having a higher refractive index than the refractive index of the optical functional layer, on the lateral surface of the optical functional layer (FIGS. 1A and 1B). Hereinafter, the film 5 having a higher refractive index than the refractive index of the optical functional layer, and the method for forming the film are described.

It is preferable that the film 5 having a higher refractive index than the refractive index of the optical functional layer be an inorganic film. Formation with the inorganic film can impart gas barrier properties to the film 5. With respect to the gas barrier properties, the oxygen permeability is preferably 1.00 cm$^3$/(m$^2$·day·atm) or less, more preferably 0.1 cm$^3$/(m$^2$·day·atm) or less, particularly preferably 0.001 cm$^3$/(m$^2$·day·atm) or less, as in the barrier layer described above.

It is preferable that the material forming the inorganic film having a higher refractive index than the refractive index of the optical functional layer include at least one of oxides, nitrides and oxynitrides of one or more metals selected from silicon, aluminum, indium, tin, zinc, titanium, chromium, nickel, copper, silver and gold.

Further, it is preferable that the film 5 having a higher refractive index than the refractive index of the optical functional layer is a thin film in which a laminated structure including a first metal layer and a metal oxide layer is repeated more than once. Example of a material of the first metal layer preferably includes one or more metals selected from aluminum, titanium, chromium, nickel, tin, copper and silver. Example of a material of the metal oxide layer preferably includes an oxide of one or more metals selected from aluminum, titanium, chromium, nickel, tin, copper and silver.

Further, it is preferable that the film further includes a second metal layer on the thin film, i.e. the metal oxide layer. Example of a material of the second metal layer preferably includes one or more metals selected from aluminum, titanium, chromium, nickel, tin, copper and silver. Although the metal included in any two or three of the first metal layer, metal oxide layer and second metal layer can be identical to each other, or different from each other, it is preferable that the metal included in the first metal layer, metal oxide layer and second metal layer can be identical to each other.

With respect to the method for forming the film 5 having a higher refractive index than the refractive index of the optical functional layer, the film 5 can be formed by a sputtering method, a vacuum vapor deposition method, an ion plating method or a plasma CVD method. Formation by such a method enables to superimpose a plurality of films and to impart the film 5 on the lateral surface of the optical functional layer, thereby allowing a film to be efficiently formed on the lateral surface of the optical functional layer. Specifically, as described above, the laminate film 170 comprising the barrier layer stacked on the optical functional layer is formed, and thereafter this laminate film 170 is cut to a predetermined size and a plurality thereof are superimposed. In addition, a protection film is stacked on the upper surface of a body obtained from a plurality of the laminate films superimposed. Then, the laminate films superimposed are placed in an apparatus for film formation by the above method, and film formation can allow the film 5 to be efficiently formed on the lateral surface of the optical functional layer. For the apparatus which forms the film 5, for example, a sputtering apparatus illustrated in FIG. 5 can be used.

The thickness of the film 5 is preferably 5 to 500 nm, more preferably 10 to 200 nm, further preferably 15 to 100 nm, preferably 20 to 50 nm. The thickness of the film 5 can be in the above range to thereby prevent ingress of steam and/or oxygen into the laminate film, maintaining function(s) for a long time.

Further, in case that the film 5 is a thin film including the first metal layer and the metal oxide layer, the thickness of the first metal layer is preferably 5 nm or more and 50 nm or less, and the thickness of the metal oxide layer is preferably 0.1 nm or more and 5 nm or less. Furthermore, the thickness of the second metal layer is preferably 10 nm or more and 200 nm or less when the second metal layer is added.

In addition, it is preferable that the refractive index of the film 5 be 1.5 or more. The refractive index of the optical functional layer 4 is required to be the same as that of a protection resin (ligand) of a quantum dot included in the optical functional layer 4, and is preferably 1.3 or more and 1.6 or less. The difference between the refractive index of the optical functional layer 4 and the refractive index of the film 5 is preferably 0.2 or more, more preferably 0.4 or more. The difference between the refractive index of the optical functional layer 4 and the refractive index of the film 5 can be in this range to thereby allow light to be reflected in the lateral surface of the laminate film, and therefore the optical path length in the laminate film can be extended and luminance can be enhanced. The upper limit of the refractive index of the film 5 is not particularly limited, and is preferably 3.0 or less in terms of the material forming the film 5. Similarly, the upper limit of the difference between the refractive index of the optical functional layer 4 and the refractive index of the film 5 is not also particularly limited, and is preferably 1.5 or less.

The refractive index can be adjusted by adjusting the amount of oxygen to be introduced, in the case where a film is provided by vacuum film formation. For example, a refractive index of $SiO_2$ of 1.5 can be increased to a refractive index of 1.6 to 1.7 by a reduction in the amount of oxygen to be introduced and an increase in the proportion of SiO in the film.

(Method for Forming Film Having Higher Refractive Index than Refractive Index of Optical Functional Layer)

Figure 5:
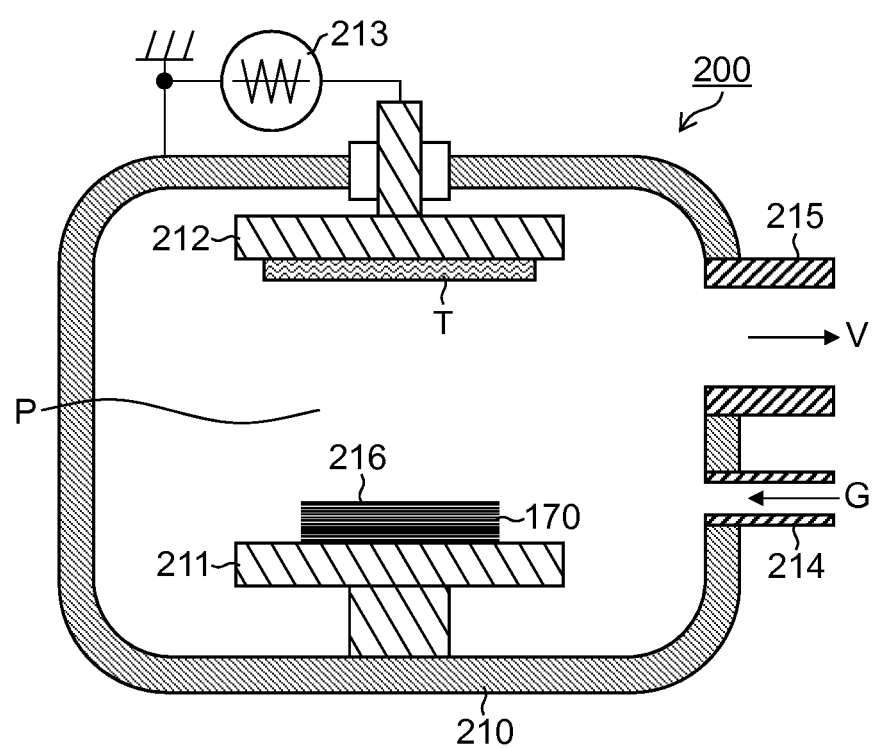
FIG. 5 is a schematic view of one example of a production facility which forms a film on a lateral surface of an optical functional layer.

FIG. 5 illustrates one example of a production facility which forms the film 5 having a higher refractive index than that of the optical functional layer, on the lateral surface of the optical functional layer. FIG. 5 is a view illustrating of formation of the film by a sputtering method.

As illustrated in FIG. 5, a sputtering apparatus 200 is schematically configured from a vacuum vessel 210 provided with, therein, a holder 211 which holds the laminate film, and a plasma electrode (cathode electrode) 212 which generates plasma.

Since the film is formed on the lateral surface of the laminate film 170 formed in FIG. 4, by a sputtering method, the laminate film 170 rolled up by a roll-up machine is cut to predetermined shape and size. Herein, the predetermined shape and size correspond to a size so that the film is accommodated in the sputtering apparatus, and these can be determined depending on the application of the laminate film.

It is preferable, with respect to the laminate film, to superimpose a plurality of the laminate films and to form the film on a lateral surface. The plurality of the laminate films can be superimposed and the film can be formed to thereby shorten the total treatment time in treatment of the laminate films. The number of the laminate films superimposed in formation of the film 5 on a lateral surface of the optical functional layer is preferably larger in consideration of productivity. The maximum number depends on the thickness of the laminate film and the coating width of the film, or the vacuum chamber and the laminate film, and the size of a fixing tool and the grip force thereof. In consideration of a general step, including handling, the maximum number is preferably about 100 to 3000 when the thickness of the laminate film is 150 μm. Herein, a protection film 216 is stacked on the upper surface of the laminate film for the purpose of protection from formation of the film.

The holder 211 and the plasma electrode 212 are spaced away and arranged so as to be opposite to each other, and thus a target T is mounted on the plasma electrode 212. The plasma electrode 212 is connected to a RF (Radio Frequency) power source 213.

To the vacuum vessel 210 are mounted a gas introduction tube 214 which introduces gas G required for film formation, into the vacuum vessel 210, and a gas discharge tube 215 which performs evacuation V of the gas in the vacuum vessel 210. For the gas G, Ar, a mixed gas of $Ar/O_2$, or a mixed gas of $Ar/N_2$ can be used. The target T can be selected from silicon, aluminum, indium, tin, zinc, titanium, chromium, nickel, copper, silver and gold, and at least any of oxygen and nitrogen can be used as a reaction gas to thereby form a film as an oxide, a nitride or an oxynitride.

In case of forming a thin film on a lateral surface of the laminate film 170, a first metal layer including one or more metals selected from aluminum, titanium, chromium, nickel, tin, copper and silver is formed on the lateral surface of the cut laminate film 170 by a sputtering method. Next, the metal oxide layer is formed on the first metal layer by a sputtering method by introducing oxygen as a reactive gas. By switching states of introducing oxygen and not introducing oxygen, the first metal layer and metal oxide layer are repeatedly formed. In case of further including the second metal layer, after the second metal layer has been formed, the second metal layer is formed by using argon (Ar) as a gas G (reactive gas). By forming the metal oxide layer on the first metal layer, a pin hole or crack in the first metal layer can be sealed by the metal oxide layer, and light leakage from an end surface of the film can be prevented. Further, by forming the second metal layer on the metal oxide layer, a mirror can be formed by the second metal layer. Accordingly, light incident to the end surface of the film can be reflected by the mirror (second metal layer) at high reflectivity and can be reused. And, if the film is used as a wavelength conversion member, and the film can achieve a high luminance.

(Wavelength Conversion Member)

The laminate film of the present embodiment can include any one of a quantum dot or a quantum rod, and thus can be used as a wavelength conversion member and can be used with being incorporated in a liquid crystal display device or the like.

A laminate film including at least any of the quantum dot or the quantum rod for use as the wavelength conversion member (hereinafter, also referred to as "quantum dot or the like) has a wavelength conversion layer including the quantum dot or the like which is at least excited by incident excitation light to emit fluorescent light.

The wavelength conversion layer in the wavelength conversion member usually includes the quantum dot or the like in an organic matrix. The organic matrix is usually a polymer obtained by polymerizing the curable compound by light irradiation or the like.

The film thickness of the wavelength conversion layer is preferably in the range from 1 to 500 µm, more preferably in the range from 10 to 250 µm, particularly preferably in the range from 30 to 150 µm. When the wavelength conversion layer is formed from a plurality of layers, the film thickness of one layer is preferably in the range from 1 to 300 µm, more preferably in the range from 10 to 250 µm.

(Backlight Unit)

A backlight unit according to one aspect of the presently disclosed subject matter includes at least the laminate film of the presently disclosed subject matter, and a light source. The laminate film is preferably included as a constituent member of a backlight unit of a liquid crystal display device.

Figure 6A:
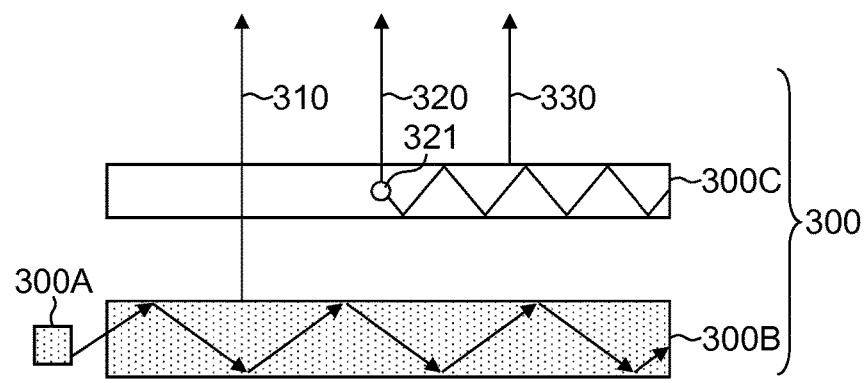
FIGS. 6A and 6B are views explaining one example of a backlight unit including the laminate film.
Figure 6B:
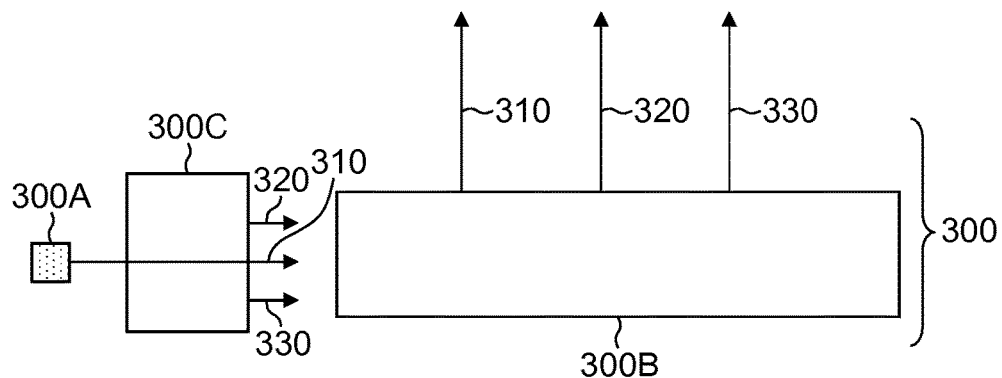

FIGS. 6A and 6B are explanation views of one example of a backlight unit 300 including the laminate film according to one aspect of the presently disclosed subject matter. In FIGS. 6A and 6B, the backlight unit 300 includes a light source 300A, and a light guide plate 300B for serving as a surface light source. In an example illustrated in FIG. 6A, the laminate film as the wavelength conversion member is disposed on the path of light incident from the light guide plate. On the other hand, in an example illustrated in FIG. 6B, the laminate film as the wavelength conversion member is arranged between the light guide plate and the light source.

In the example illustrated in FIG. 6A, light emitted from the light guide plate 300B is incident to a wavelength conversion member 300C. In the example illustrated in FIG. 6A, light 310 emitted from the light source 300A arranged on the edge portion of the light guide plate 300B is blue light, and is emitted toward a liquid crystal cell (not illustrated) from a surface of the light guide plate 300B, facing the liquid crystal cell. The wavelength conversion member 300C arranged on the route of light (blue light 310) incident from the light guide plate 300B includes at least a quantum dot (A) which is excited by the blue light 310 to emit red light 330, and a quantum dot (B) which is excited by the blue light 310 to emit green light 320 (in the Figure, the quantum dot (B) is designated as a reference numeral 321). Thus, the green light 320 and the red light 330 excited and emitted, and the blue light 310 penetrating through the quantum dot wavelength conversion member 300C are emitted from the backlight unit 300. Emission light of RGB can be thus emitted to thereby realize white light.

In the present embodiment, the film having a higher refractive index than the refractive index of the optical functional layer is provided on the lateral surface in the horizontal direction of the wavelength conversion member 300C in FIG. 6A. The effect of the presently disclosed subject matter is described using a quantum dot (B) 321. Light emitted from the light guide plate 300B emits green light 320 by the quantum dot (B) 321. Light obliquely emitted, of the green light excited in the quantum dot (B) 321, however, is reflected at the interface of the wavelength conversion member 300C and reaches the end surface. Conventionally, light reaching the end surface has been sometimes leaked from the end surface of the wavelength conversion member 300C because no film has been formed. In the present embodiment, the film can be provided on the end surface and reflection can be made, and therefore luminance can be enhanced.

The example illustrated in FIG. 6B is the same as the aspect illustrated in FIG. 6A except that arrangement of the light conversion member and the light guide plate is different. In the example illustrated in FIG. 6B, the green light 320 and the red light 330 excited, and the blue light 310 penetrating through the wavelength conversion member 300C are emitted from the wavelength conversion member 300C and are incident to the light guide plate, thereby realizing a surface light source.

<Emission Wavelength of Backlight Unit>

From the viewpoint of realizing high luminance and high color reproducibility, it is preferable to use, as the backlight unit, one formed into a multi-wavelength light source. A preferable one aspect can include a backlight unit which emits blue light having a center emission wavelength in the wavelength band region of 430 to 480 nm and having an emission intensity peak with a half-value width of 100 nm or less, green light having a center emission wavelength in the wavelength band region of 500 to 600 nm and having an emission intensity peak with a half-value width of 100 nm or less, and red light having a center emission wavelength in the wavelength band region of 600 to 680 nm and having an emission intensity peak with a half-value width of 100 nm or less.

From the viewpoint of further more enhancements in luminance and color reproducibility, the wavelength band region of the blue light emitted from the backlight unit is preferably 450 to 480 nm, more preferably 460 to 470 nm.

From the same viewpoint, the wavelength band region of the green light emitted from the backlight unit is preferably 520 to 550 nm, more preferably 530 to 540 nm.

In addition, from the same viewpoint, the wavelength band region of the red light emitted from the backlight unit is preferably 610 to 680 nm, more preferably 620 to 640 nm.

In addition, from the same viewpoint, all the half-value widths of the respective emission intensities of the blue light, the green light and the red light emitted from the backlight unit are preferably 80 nm or less, more preferably 50 nm or less, further preferably 45 nm or less, still more preferably 40 nm or less. Among them, the half-value width of each emission intensity of the blue light is particularly preferably 30 nm or less.

The backlight unit includes at least a light source together with the above wavelength conversion member. In one aspect, for the light source, a light source which emits blue light having a center emission wavelength in the wavelength band region of 430 nm to 480 nm, for example, a blue light emitting diode which emits blue light can be used. When the light source which emits blue light is used, it is preferable that a quantum dot-containing laminate body include at least a quantum dot (A) which is excited by excitation light to emit red light, and a quantum dot (B) which is excited by excitation light to emit green light. Thus, the blue light which is emitted from the light source to penetrate through the quantum dot-containing laminate body, and the red light and the green light which are emitted from the wavelength conversion member can realize white light.

Alternatively, in another aspect, for the light source, a light source which emits ultraviolet light having a center emission wavelength in the wavelength band region of 300 nm to 430 nm, for example, an ultraviolet light emitting diode can be used. In this case, it is preferable that the wavelength conversion layer include, together with the quantum dots (A) and (B), a quantum dot (C) which is excited by excitation light to emit blue light. Thus, the red light, the green light and the blue light emitted from the quantum dot-containing laminate body can realize white light.

In another aspect, two light sources selected from the group consisting of a blue laser which emits blue light, a green laser which emits green light and a red laser which emits red light can be used to allow a quantum dot which emits fluorescent light having a different emission wavelength from those of light emitted from the light sources to be present in the quantum dot-containing laminate body, thereby allowing the two kinds of light emitted from the light sources, and light emitted from the quantum dot of the quantum dot-containing laminate body to realize white light.

<Scattering Particle>

The wavelength conversion member can have a light-scattering function in order to efficiently extract fluorescent light of the quantum dot to the outside. The light-scattering function may be provided in the wavelength conversion layer, or a layer having the light-scattering function may be separately provided as a light-scattering layer.

As one aspect, it is also preferable that a scattering particle be added into the wavelength conversion layer.

As another aspect, it is also preferable that a light-scattering layer be provided on the surface of the wavelength conversion layer. Scattering in the light-scattering layer may depend on the scattering particle, or depend on the surface irregularity.

<Configuration of Backlight Unit>

The configuration of the backlight unit can be an edge light system in which a light guide plate, a reflection plate and the like are used as constituent members. An example of the backlight unit of the edge light system is illustrated in FIGS. 6A and 6B, but the backlight unit according to one aspect of the presently disclosed subject matter may be in a direct type system. For the light guide plate, a known one can be used without any limitation.

The backlight unit can also include a reflection member at the rear section of the light source. Such a reflection member is not particularly limited, and a known one can be used and is described in Japanese Patent No. 3416302, Japanese Patent No. 3363565, Japanese Patent No. 4091978, Japanese Patent No. 3448626 and the like, the contents of which are herein incorporated.

It is also preferable that the backlight unit have a blue wavelength selection filter that selectively transmits light having a wavelength shorter than 460 nm, of blue light.

It is also preferable that the backlight unit have a red wavelength selection filter that selectively transmits light having a wavelength longer than 630 nm, of red light.

Such blue wavelength selection filter and red wavelength selection filter are not particularly limited, and those known can be used. Such filters are described in, for example, Japanese Patent Application Laid-Open No. 2008-52067, the content of which is herein incorporated.

It is also preferable that the backlight unit include, in addition thereto, a diffuser panel, a diffusion sheet, a prism sheet (such as BEF series produced by 3M) and a light guide which are known. Other members are also described in Japanese Patent No. 3416302, Japanese Patent No. 3363565, Japanese Patent No. 4091978, Japanese Patent No. 3448626 and the like, the contents of which are herein incorporated.

(Liquid Crystal Display Device)

A liquid crystal display device according to one aspect of the presently disclosed subject matter includes at least the backlight unit of the presently disclosed subject matter, and a liquid crystal cell.

<Configuration of Liquid Crystal Display Device>

The driving mode of the liquid crystal cell is not particularly limited, and various modes such as twisted nematic (TN), super twisted nematic (STN), vertical alignment (VA), in-plane switching (IPS) and optically compensated bend cell (OCB) can be utilized. The liquid crystal cell is preferably a VA mode, an OCB mode, an IPS mode or a TN mode, but is not limited thereto. Examples of the configuration of the liquid crystal display device of the VA mode include the configuration illustrated in FIG. 2 in Japanese Patent Application Laid-Open No. 2008-262161. A specific configuration of the liquid crystal display device, however, is not particularly limited, and a known configuration can be adopted.

A liquid crystal display device of one embodiment is configured to have a liquid crystal cell in which a liquid crystal layer is sandwiched between opposite substrates provided with an electrode on at least one of the substrates, this liquid crystal cell being disposed between two polarization plates. The liquid crystal display device includes a liquid crystal cell in which a liquid crystal is enclosed between the upper and lower substrates, and allows the orientation state of the liquid crystal to be changed by voltage application, to perform display of an image. The liquid crystal display device further includes a polarization plate protection film or an optical compensation member for performing optical compensation, and a functional layer provided with a bonding layer or the like, if necessary. In addition, a surface layer such as a forward scattering layer, a primer layer, a charge-suppressing layer and an undercoat layer may also be disposed together with (or instead of) a color filter substrate, a thin layer transistor substrate, a lens film, a diffusion sheet, a hard coat layer, a reflection suppressing layer, a low reflection layer, an antiglare layer and the like.

Figure 7:
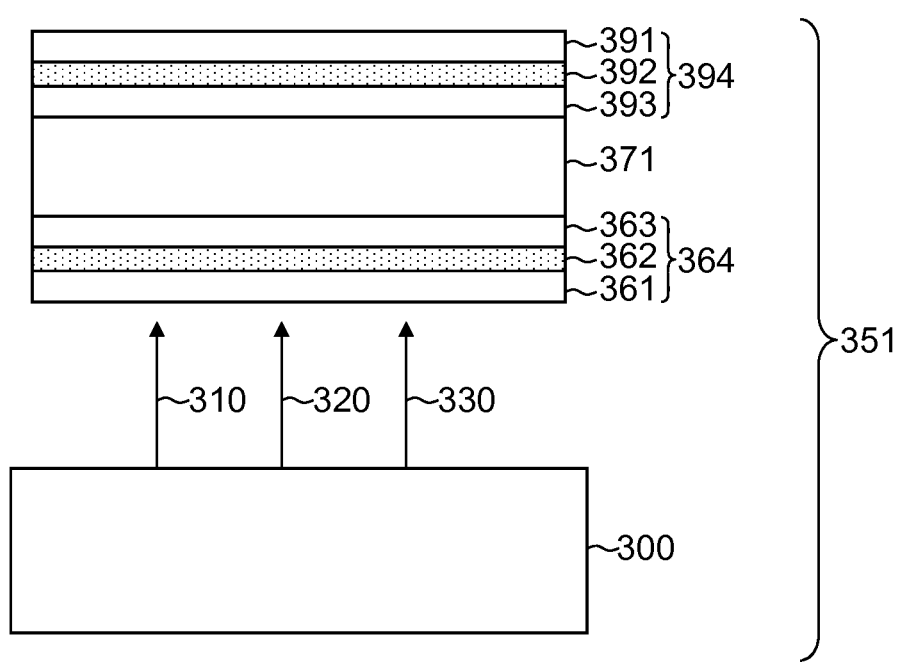
FIG. 7 is a view explaining one example of a liquid crystal display device.

FIG. 7 illustrates one example of a liquid crystal display device according to one aspect of the presently disclosed subject matter. A liquid crystal display device 351 illustrated in FIG. 7 has a polarization plate 364 facing the backlight, on a surface facing the backlight of a liquid crystal cell 371. The polarization plate 364 facing the backlight may or may not include a polarization plate protection film 361 on a surface facing the backlight of a polarizer 362 facing the backlight, but preferably includes it.

It is preferable that the polarization plate 364 facing the backlight have a configuration in which the polarizer 362 facing the backlight is sandwiched between two polarization plate protection films 361 and 363.

In the present specification, the polarization plate protection film closer to the liquid crystal cell over the polarizer is referred to as the polarization plate protection film on the inner side, and the polarization plate protection film farther from the liquid crystal cell over the polarizer is referred to as the polarization plate protection film on the outer side. In the example illustrated in FIG. 7, the polarization plate protection film 363 corresponds to the polarization plate protection film on the inner side, and the polarization plate protection film 361 corresponds to the polarization plate protection film on the outer side.

The polarization plate facing the backlight may have a phase difference film as the polarization plate protection film on the inner side, facing the liquid crystal cell. For such a phase difference film, a known cellulose acrylate film or the like can be used.

The liquid crystal display device 351 has a polarization plate 394 facing the display, on an opposite surface to the surface facing the backlight of the liquid crystal cell 371. The polarization plate 394 facing the display has a configuration in which a polarizer 392 facing the display is sandwiched between the two polarization plate protection films 391 and 393. The polarization plate protection film 393 corresponds to the polarization plate protection film on the inner side, and the polarization plate protection film 391 corresponds to the polarization plate protection film on the outer side.

The backlight unit 300 which the liquid crystal display device 351 has is as described above.

The liquid crystal cell, the polarization plate, the polarization plate protection film and the like which form the liquid crystal display device according to one aspect of the presently disclosed subject matter are not particularly limited, and those produced by a known method and commercialized products can be used without any limitation. Of course, a known intermediate layer such as a bonding layer can also be provided between respective layers.

(Color Filter)

For the method for forming RGB pixels on a color filter substrate, various known methods can be used. For example, a desired black matrix, and a pixel pattern of R, G, B can be formed on a glass substrate by using a photomask or a photoresist, or coloring inks for R, G, B pixels can be used and ink compositions can be discharged to a black matrix with a predetermined width and a region partitioned by a black matrix at a broader width than that of the black matrix at n matrix interval (a concave portion surrounded by a convex portion) by using an inkjet type printing apparatus until a desired density is achieved, to produce a color filter of a pattern of R, G, B. After an image is colored, baking or the like may also be performed to completely cure each pixel and black matrix.

Preferable properties of the color filter are described in Japanese Patent Application Laid-Open No. 2008-083611 and the like, the contents of which are herein incorporated.

As the pigment for the color filter, a known pigment can be used without any limitation. While the pigment is currently generally used, a color filter made by a dye may be adopted as long as the dye is a coloring agent which can control spectroscopy and can ensure process stability and reliability.

(Black Matrix)

It is preferable that a black matrix be arranged among respective pixels in the liquid crystal display device. A material which forms a black stripe includes one in which a film by sputtering of a metal such as chromium is used, and a light shieldable photosensitive composition as a combination of a photosensitive resin with a black colorant or the like. Specific examples of the black colorant include carbon black, titanium carbon, iron oxide, titanium oxide and graphite, and among them, carbon black is preferable.

(Thin Layer Transistor)

The liquid crystal display device can also have a TFT substrate having a thin layer transistor (hereinafter, also referred to as TFT). It is preferable that the thin layer transistor have an oxide semiconductor layer in which the carrier concentration is less than $1\times10^{14}/cm^3$. A preferable aspect of the thin layer transistor is described in Japanese Patent Application Laid-Open No. 2011-141522, the content of which is herein incorporated.

The liquid crystal display device according to one aspect of the presently disclosed subject matter described above includes the backlight unit including the quantum dot-containing laminate body which can exhibit high light transmittance, and thus can realize high luminance and high color reproducibility.

EXAMPLES

Hereinafter, the presently disclosed subject matter is described in more detail with reference to Examples. The presently disclosed subject matter, however, is not limited to such Examples, and materials, amounts to be used, proportions, treatment contents, treatment procedures and the like shown in Examples below can be appropriately changed without departing from the gist of the presently disclosed subject matter.

(Production of Laminate Film)
<Support>

A polyethylene terephthalate film (PET film, produced by Toyobo Co., Ltd., trade name: Cosmoshine A4300, thickness: 50 μm, width: 1000 mm, length: 100 m) was used.

<Formation of Organic Layer>

Formation of an organic layer was performed on the support. First, preparation of a coating liquid for organic layer formation was performed. The coating liquid for organic layer formation was prepared as follows: TMPTA (trimethylolpropane triacrylate, produced by Daicel-Cytec Co., Ltd. (DAICEL-ALLNEX LTD. at present)) and a photopolymerization initiator (produced by Lamberti SpA, ESACUREKTO 46) were provided, weighed so that the weight ratio of TMPTA:photopolymerization initiator was 95:5, and dissolved in methyl ethyl ketone to provide the coating liquid having a solid content concentration of 15%.

The PET film as the support was coated with this coating liquid for organic layer formation by a roll-to-roll system using a die coater. The PET film after coating was allowed to pass through a drying zone at 50° C. for 3 minutes, and thereafter was irradiated with ultraviolet light (cumulative amount of radiation: about 600 mJ/cm$^2$) and cured by UV curing. A polyethylene film (PE film, produced by Sun A. Kaken Co., Ltd., trade name: PAC2-30-T) as a protection film was attached at a pass roll immediately after the UV curing, and conveyed and rolled up. The thickness of the organic layer formed on the support was 1 μm.

<Formation of Inorganic Layer>

Next, a roll-to-roll type CVD apparatus was used to form an inorganic layer (silicon nitride (SiN) layer) on the surface of the organic layer. The support was fed from a feeding machine and passed through a final film surface touch roll before film formation of the inorganic layer, and thereafter the protection film was peeled to form the inorganic layer on the organic layer exposed. For formation of the inorganic layer, a silane gas (flow rate: 160 sccm), an ammonia gas (flow rate: 370 sccm), a hydrogen gas (flow rate: 590 sccm) and a nitrogen gas (flow rate: 240 sccm) were used as raw material gases. A high-frequency power source with a frequency of 13.56 MHz was used as a power source to form the SiN layer. The film formation pressure was 40 Pa, and the arrival film thickness was 50 nm.

The inorganic layer was thus formed on the organic layer, a protective PE film was attached at a film surface touch roll portion after the formation, and an inorganic film was conveyed without being in contact with the pass roll, and thereafter rolled up.

<Formation of Optical Functional Layer>

The protective PE film of the barrier support (barrier layer) including the support, the organic film and the inorganic film, formed as described above, was peeled, and the inorganic layer was coated with a coating liquid for optical functional layer formation to form a coating film. The coating liquid for optical functional layer formation was prepared so as to have the following composition. The coating film of the optical functional layer was sandwiched between barrier supports formed by the same method as the above, and subjected to UV curing to form a composite film in a roll-to-roll manner.

(Composition of Coating Liquid for Optical Functional Layer Formation)

| | |
|---|---|
| Dispersion liquid of quantum dot 1 in toluene (emission local maximum: 520 nm) | 10 parts by mass |
| Dispersion liquid of quantum dot 2 in toluene (emission local maximum: 630 nm) | 1 part by mass |
| Lauryl methacrylate | 2.4 parts by mass |
| Trimethylolpropane triacrylate | 0.54 parts by mass |
| Photopolymerization initiator (Irgacure 819 (produced by Ciba Speciality Chemicals Co., Ltd.)) | 0.009 parts by mass |

For quantum dots 1 and 2, the following nano crystals having a core-shell structure (InP/ZnS) were used.
Quantum dot 1: INP 530-10 (produced by NN-Labs, LLC)
Quantum dot 2: INP 620-10 (produced by NN-Labs, LLC)

The viscosity of the coating liquid for optical functional layer formation was 50 mPa·s.

<Sheet Processing>

The composite film formed was punched using a Thompson blade having a blade tip angle of 17° to form an A4 size sheet shape.

<Treatment of End Surface>

The composite film cut in a sheet shape was superimposed for 1000 sheets, and a sputtering apparatus was used to form an inorganic layer on a lateral surface of a laminate body of the composite films. Silicon, argon, and oxygen were used as a target, a discharge gas, and a reaction gas, respectively. The film formation pressure was 0.1 Pa, and the arrival film thickness was 50 nm (Example 1).

In addition, the amount of oxygen as the reaction gas to be introduced was reduced, and the film on the lateral surface was made of SiO (Example 2). Alumina was used as the target, and the thickness of the film on the lateral surface was changed to form a laminate film (Examples 3 to 6). Titanium was used as the target to form the film on the lateral surface (Example 7).

Further, a thin film is formed on a lateral surface of the laminate film as described below. Until the formed composite film is set on a sputtering apparatus, the method same as the method of Example 1 is performed. Aluminum is used as a target, argon is used as discharge gas, a deposition pressure is set to 0.5 Pa, and the aluminum layer whose thickness is 20 nm is formed. Then, oxygen is introduced as a reactive gas, and the metal oxide layer of aluminum oxide whose thickness is 1 nm is formed on the first metal layer. By repeating the above step of forming the aluminum layer and the aluminum oxide layer five times, a thin film whose total thickness is 105 nm is formed (Example 8). The aluminum layer whose thickness is 200 nm is formed as the second metal layer on the thin film of Example 8 by a method same as the method for forming the first metal layer of Example 8 (Example 9). In Example 9, the total thickness of the thin film is 305 nm.

The results are shown in Table 1. Herein, evaluations described in Table 1 were performed by the following methods and standards. In Comparative Example 1, the film in Example 1, but having no film formed on the lateral surface thereof, was also evaluated.

<Measurements of Refractive Index and Film Thickness>

Measurement was performed using a spectroscopic ellipsometer FE-5000 manufactured by Otsuka Electronics Co., Ltd.

<Measurement of Luminance>

Each of the laminate films was mounted on Kindle fire HDX 7 in, and the luminance was visually determined.

Comparative Example in which no film was provided on the lateral surface was rated as D as the reference, and rating was performed as follows: a slight enhancement in luminance was rated as C, an enhancement in luminance was rated as B, and a significant enhancement in luminance was rated as A.

The luminance half time was confirmed as the time at which each of the laminate films was mounted on Kindle fire HDX 7 in after a lapse of a predetermined time under an environment of a temperature of 60° C. and a humidity of 90% and the luminance was halved from the initial value.

<Bending>

Each of the laminate films was repeatedly rolled around a cylinder of ϕ100 mm one hundred times, and whether or not cracking occurred on the end portion of each of the laminate films was observed. Cracking was observed using an optical microscope at 400-fold magnification, and rated according to the following criteria.

AA: an end surface of a thin film was visually determined as a mirror when viewed by an eye
A: no cracking of end portion was observed
B: cracking was partially observed
C: cracking was entirely observed

TABLE 1

| | Type of film | Thickness of film | Refractive index of film | Refractive index of optical functional layer | Luminance | Luminance half time | Bending |
|---|---|---|---|---|---|---|---|
| Comparative Example 1 | None | None | None | 1.4 | D | 100 h | A |
| Example 1 | $SiO_x$ | 50 nm | 1.5 | 1.4 | C | Over 1000 h | A |
| Example 2 | SiO | 50 nm | 1.8 | 1.4 | B | Over 1000 h | A |
| Example 3 | $Al_2O_x$ | 10 nm | 1.7 | 1.4 | B | 100 h | A |
| Example 4 | $Al_2O_x$ | 20 nm | 1.7 | 1.4 | B | 1000 h | A |
| Example 5 | $Al_2O_x$ | 200 nm | 1.7 | 1.4 | B | Over 10000 h | A |
| Example 6 | $Al_2O_x$ | 500 nm | 1.7 | 1.4 | B | Over 10000 h | B |
| Example 7 | $TiO_x$ | 50 nm | 2.6 | 1.4 | A | Over 10000 h | A |
| Example 8 | Thin film: (Al + $Al_2O_x$) × 5 | 105 nm | 1.5 | 1.4 | B | Over 10000 h | AA |
| Example 9 | Thin film: (Al + $Al_2O_x$) × 5 Second metal layer: Al | 305 nm | 1.5 | 1.4 | A | Over 10000 h | A |

As shown in Table 1, as compared with Comparative Example 1 in which no film was formed on the lateral surface of the optical functional layer, the luminance was enhanced in each of Examples 1 to 4 in which the film was formed thereon, and the refractive index of the film on the lateral surface could be increased to result in a more enhancement in luminance. While the thickness of the film on the lateral surface could be increased to thereby extend the luminance half time, an increase in thickness of the film caused cracking on the end portion in the bending evaluation. Therefore, the thickness of the film is preferably 20 nm or more and 50 nm or less.

It could be confirmed that the luminance half time could be extended to maintain function(s) for a long time in each of Examples 1 to 4 in which the film having a thickness of 20 nm to 200 nm was formed. It could also be confirmed that the surface luminance was also enhanced as compared with in Comparative Example 1. While a thicker thickness of the film is preferable in terms of the luminance half time and the surface luminance, the thickness is preferably 20 nm or more and 100 nm or less because a thicker thickness of the film causes cracking of the film.

It could be confirmed that the film of Example 8 can achieve a better bending evaluation by forming the thin film including the first metal layer and the metal oxide layer on the lateral surface. And, according to Example 8, higher strength film can be formed. Furthermore, it is confirmed that the film of Example 9 can enhance the luminance by forming the second metal layer.

What is claimed is:

1. A laminate film comprising:
an optical functional layer; and
a barrier layer stacked on at least one surface of the optical functional layer,
wherein the laminate film has a film having a higher refractive index than a refractive index of the optical functional layer, on a lateral surface of the optical functional layer,
wherein the film is an inorganic film, and
wherein the film is a thin film in which a laminated structure is repeated more than once, the laminated structure including a first metal layer including one or more metals selected from aluminum, titanium, chromium, nickel, tin, copper and silver, and a metal oxide layer including an oxide of one or more metals selected from aluminum, titanium, chromium, nickel, tin, copper and silver.

2. The laminate film according to claim 1, wherein the optical functional layer comprises at least one of a quantum dot and a quantum rod.

3. The laminate film according to claim 1, wherein the film is a film having gas barrier properties.

4. The laminate film according to claim 1, wherein the film includes at least one of oxides, nitrides and oxynitrides of one or more metals selected from silicon, aluminum, indium, tin, zinc, titaniulm, chromium, nickel, copper, silver and gold.

5. The laminate film according to claim 1, wherein the film further includes a second metal layer including one or more metals selected from aluminum, titanium, chromium, nickel, tin, copper and silver, on the thin film.

6. The laminate film according to claim 1, wherein a thickness of the first metal layer is 5 nm or more and 50 nm or less, and a thickness of the metal oxide layer is 0.1 nm or more and 5 nm or less.

7. The laminate film according to claim 1, wherein a thickness of the film is 5 to 500 nm.

8. The laminate film according to claim 1, wherein a thickness of the film is 20 to 200 nm.

9. The laminate film according to claim 5, wherein a thickness of the second metal layer is 10 nm or more and 200 nm or less.

10. The laminate film according to claim 1, wherein the refractive index of the optical functional layer is in a range of 1.3 or more and 1.6 or less, and the refractive index of the film is 1.5 or more.

11. The laminate film according to claim 1, wherein a difference between the refractive index of the optical functional layer and the refractive index of the film is 0.2 or more.

12. A backlight unit comprising:
the laminate film according to claim 1; and
a light source.

13. A liquid crystal display device comprising:
the backlight unit according to claim 12; and
a liquid crystal cell.

* * * * *